US012621891B2

(12) United States Patent
Shafin et al.

(10) Patent No.: US 12,621,891 B2
(45) Date of Patent: May 5, 2026

(54) EMLMR OPERATION FOR P2P COMMUNICATION

(71) Applicant: Samsung Electronics Co., Ltd., Suwon-si (KR)

(72) Inventors: Rubayet Shafin, Allen, TX (US); Boon Loong Ng, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 397 days.

(21) Appl. No.: 18/315,990

(22) Filed: May 11, 2023

(65) Prior Publication Data

US 2023/0371102 A1 Nov. 16, 2023

Related U.S. Application Data

(60) Provisional application No. 63/341,855, filed on May 13, 2022.

(51) Int. Cl.
*H04W 76/15* (2018.01)
*H04W 8/24* (2009.01)
*H04W 92/18* (2009.01)

(52) U.S. Cl.
CPC ............. *H04W 76/15* (2018.02); *H04W 8/24* (2013.01); *H04W 92/18* (2013.01)

(58) Field of Classification Search
CPC ....... H04W 8/24; H04W 76/14; H04W 84/12; H04W 76/15; H04W 92/18
See application file for complete search history.

(56) References Cited

U.S. PATENT DOCUMENTS

| 2022/0029736 A1 | 1/2022 | Chu et al. |
| 2022/0104261 A1 | 3/2022 | Kwon et al. |
| 2022/0132608 A1 | 4/2022 | Chu et al. |
| 2022/0408508 A1* | 12/2022 | Chu ...................... H04L 1/1621 |

(Continued)

FOREIGN PATENT DOCUMENTS

| EP | 4167653 A1 | 4/2023 |
| KR | 10-2022-0022873 A | 2/2022 |

OTHER PUBLICATIONS

International Search Report and Written Opinion issued Aug. 11, 2023 regarding International Application No. PCT/KR2023/006536, 7 pages.

(Continued)

*Primary Examiner* — Congvan Tran

(57) ABSTRACT

Methods and apparatuses for facilitating the use of enhanced multi-link multi-radio (EMLMR) operation for peer-to-peer (P2P) communications between multi-link devices (MLDs). A non-access point (AP) MLD comprises STAs, each comprising a transceiver configured to form a P2P link with a corresponding second STA of a second non-AP MLD, and a processor operably coupled to the first STAs. At least a subset of the P2P links are also EMLMR links configured to operate in an EMLMR mode of operation for P2P communication. The processor is configured to transition the first non-AP MLD into the EMLMR mode of operation for P2P communication over the P2P links. At least one of the first STAs is configured to participate in a P2P EMLMR frame exchange with the corresponding second STA of the second non-AP MLD over at least one of the P2P links.

21 Claims, 12 Drawing Sheets

(56)                 References Cited

U.S. PATENT DOCUMENTS

| 2023/0155784 | A1* | 5/2023 | Chang | H04W 76/15 |
| | | | | 370/329 |
| 2023/0199641 | A1* | 6/2023 | Naik | H04W 76/15 |
| | | | | 370/318 |
| 2025/0227788 | A1* | 7/2025 | Sevin | H04W 76/15 |

OTHER PUBLICATIONS

Lu et al., "CC36 CR for EMLMR Links", IEEE 802.11-21/1840r4, Mar. 2022, 9 pages.
Lorgeoux et al., "CC36 CR for EMLMR Links Sets", IEEE 802. 11-22/0028r0, Jan. 2022, 8 pages.
Kwon, "Resolution for CIDs related to EMLMR (CC34)—Part 2", IEEE 802.11-21/0774r05, May 2021, 8 pages.
IEEE P802.11be™/D1.4, "Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 8: Enhancements for extremely high throughput (EHT)", Jan. 2022, 787 pages.
IEEE P802.111be™—D3.0 "Draft Standard for Information technology—Telecommunications and information exchange between systems Local and metropolitan area networks—Specific requirements; Part 11: Wireless LAN Medium Access Control (MAC) and Physical Layer (PHY) Specifications—Amendment 8: Enhancements for extremely high throughput (EHT)" Jan. 2023, 999 pages.
Extended European Search Report issued Feb. 28, 2025 regarding Application No. 23803899.6, 10 pages.

* cited by examiner

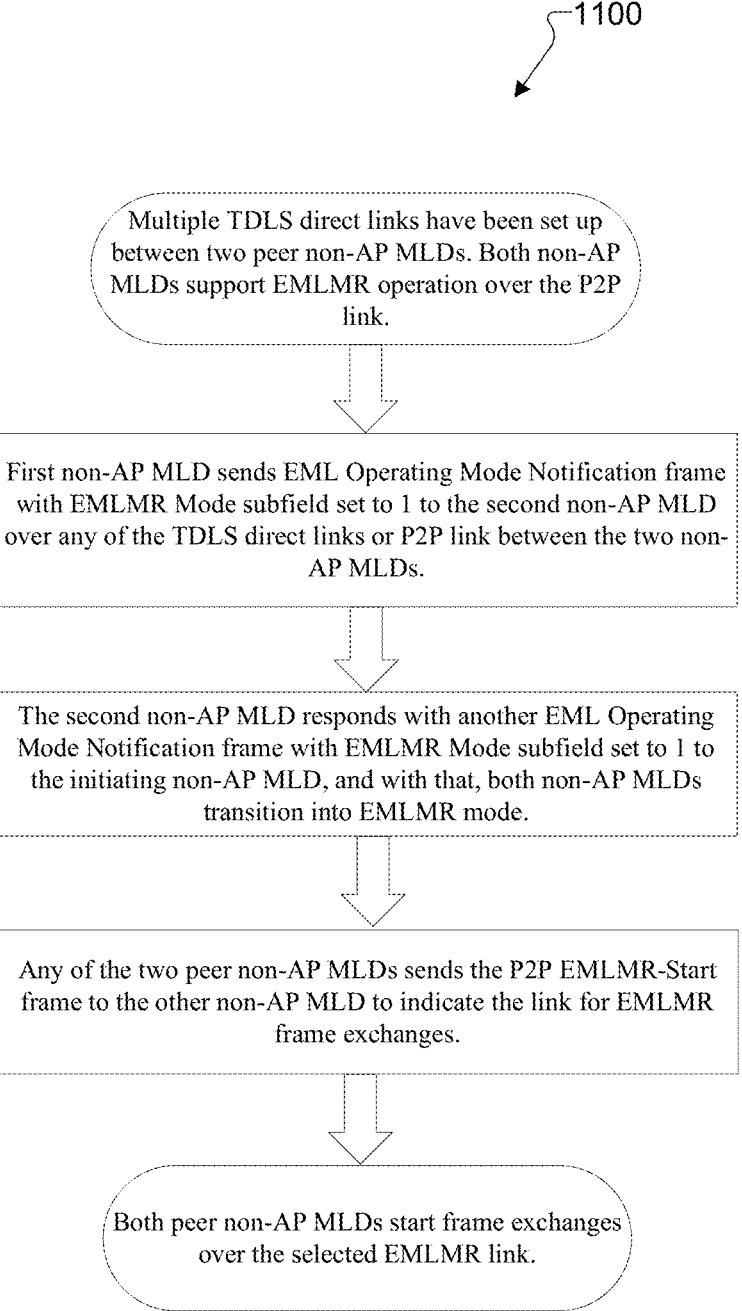

1100

Multiple TDLS direct links have been set up between two peer non-AP MLDs. Both non-AP MLDs support EMLMR operation over the P2P link.

First non-AP MLD sends EML Operating Mode Notification frame with EMLMR Mode subfield set to 1 to the second non-AP MLD over any of the TDLS direct links or P2P link between the two non-AP MLDs.

The second non-AP MLD responds with another EML Operating Mode Notification frame with EMLMR Mode subfield set to 1 to the initiating non-AP MLD, and with that, both non-AP MLDs transition into EMLMR mode.

Any of the two peer non-AP MLDs sends the P2P EMLMR-Start frame to the other non-AP MLD to indicate the link for EMLMR frame exchanges.

Both peer non-AP MLDs start frame exchanges over the selected EMLMR link.

| P2P EMLMR Support | P2P EMLMR Delay | P2P Transition Timeout |
|---|---|---|
| 1 | 3 | 4 |

Bits

EMLMR OPERATION FOR P2P COMMUNICATION

CROSS-REFERENCE TO RELATED APPLICATION AND CLAIM OF PRIORITY

This application claims priority under 35 U.S.C. § 119(e) to U.S. Provisional Patent Application No. 63/341,855 filed on May 13, 2022, which is hereby incorporated by reference in its entirety.

TECHNICAL FIELD

This disclosure relates generally to wireless communications systems that include multi-link devices. Embodiments of this disclosure relate to methods and apparatuses for facilitating the use of enhanced multi-link multi-radio operation for peer-to-peer communication between multi-link devices in a wireless local area network communications system.

BACKGROUND

Wireless local area network (WLAN) technology allows devices to access the internet in the 2.4 GHz, 5 GHz, 6 GHz, or 60 GHz frequency bands. WLANs are based on the Institute of Electrical and Electronic Engineers (IEEE) 802.11 standards. The IEEE 802.11 family of standards aim to increase speed and reliability and to extend the operating range of wireless networks.

Next generation extremely high throughput (EHT) WI-FI systems, e.g., IEEE 802.11be, support multiple bands of operation, called links, over which an access point (AP) and a non-AP device can communicate with each other. Thus both the AP and non-AP device may be capable of communicating on different bands/links, which is referred to as multi-link operation (MLO). The WI-FI devices that support MLO are referred to as multi-link devices (MLDs). With MLO, it is possible for a non-access point (non-AP) MLD to discover, authenticate, associate, and set up multiple links with an AP MLD. Channel access and frame exchange is possible on each link that is set up between the AP MLD and non-AP MLD. For each link, a non-AP MLD indicates a set of supported maximum number of spatial streams (NSS) and modulation and coding schemes (MCS) in the "EHT-MCS Map" subfield of the "Supported EHT MCS and NSS Set" field of the EHT capabilities element. This is referred to as the link-specific "Basic MCS and NSS".

The component of an MLD that is responsible for transmission and reception on one link is referred to as a station (STA). In several embodiments of non-AP MLDs, transmission on one of the links can cause limitations or impairments on the STAs of the non-AP MLD operating other links. For example, in one class of non-AP MLDs, a pair of links can form a non-simultaneous transmit and receive (NSTR) pair. In an NSTR pair of links, transmission on one link by a STA of the non-AP MLD can cause a very high self-interference at the STA of the non-AP MLD operating on the other link of the NSTR pair. Thus, during a transmission on one link by a non-AP MLD, the STA on the other link may be incapable of sensing the channel occupancy and its network allocation vector (NAV) timer may become outdated, causing a loss of medium synchronization.

The non-AP MLDs in 802.11be can have different capabilities in terms of multi-link operation. The current specification defines two special kinds of multi-link operations, namely, Enhanced Multi-Link Single-Radio Operation (EMLSR) and Enhanced Multi-Link Multi-Radio Operation (EMLMR).

Many 802.11be non-AP MLDs may only have a single radio. Enhanced Multi-Link Single Radio (EMLSR) enables a multi-link operation with a single radio. With EMLSR operation, such a non-AP MLD can achieve throughput enhancement with reduced latency—a performance close to concurrent dual radio non-AP MLDs.

EMLSR mode may also be implemented on multi-radio MLDs to improve channel access capability with limited hardware cost and power consumption or to improve spectral efficiency. In EMLSR mode, a multi-radio non-AP device behaves like a single radio device that can perform channel sensing and reception of elementary packets on multiple bands/links simultaneously but can perform reliable data communication on only one link at a time. Thus, by opportunistically selecting a link for data communication where it wins the channel contention, EMLSR can improve system spectral efficiency.

EMLMR operation is another mode of operation newly defined in the IEEE 802.11be specification. With the EMLMR mode of operation, it is possible for an MLD with multiple radios to move transmit (TX)/receive (RX) chains from one link (e.g., a first link) to another link (e.g., a second link) of the same MLD, essentially increasing the spatial stream capability of the second link.

SUMMARY

Embodiments of the present disclosure provide methods and apparatuses for facilitating the use of EMLMR operation for peer-to-peer (P2P) communications between MLDs in a wireless local area network.

In one embodiment, a non-AP MLD is provided, comprising STAs and a processor operably coupled to the STAs. The STAs each comprise a transceiver configured to form a P2P link with a corresponding second STA of a second non-AP MLD. At least a subset of the P2P links are also EMLMR links configured to operate in an EMLMR mode of operation for P2P communication. The processor is configured to transition the first non-AP MLD into the EMLMR mode of operation for P2P communication over the P2P links. At least one of the first STAs is configured to participate in a P2P EMLMR frame exchange with the corresponding second STA of the second non-AP MLD over at least one of the P2P links.

In another embodiment, a method of wireless communication is provided, performed by a first non-AP MLD that comprises first STAs. The method comprises the steps of: transitioning the first non-AP MLD into an EMLMR mode of operation for P2P communication over P2P links that are formed between the first STAs and corresponding second STAs of a second non-AP MLD, wherein at least a subset of the P2P links are also EMLMR links configured to operate in the EMLMR mode of operation for P2P communication, and participating, via at least one of the first STAs, in a P2P EMLMR frame exchange with the corresponding second STA of the second non-AP MLD over at least one of the P2P links.

In another embodiment, an AP MLD is provided, comprising APs and a processor operably coupled to the APs. The APs each comprise a transceiver configured to form a link with a corresponding first STA of a first non-AP MLD. At least a subset of the links are also EMLMR links configured to operate in an EMLMR mode of operation. The first non-AP MLD has formed P2P links that are also EMLMR links between the first STAs and corresponding second STAs of a second non-AP MLD. The processor is configured to transition the AP MLD into the EMLMR mode of operation for communication with the first non-AP MLD over the EMLMR links. At least one of the APs is configured to participate in an EMLMR frame exchange with the corresponding first STA of the first non-AP MLD over at least one of the EMLMR links.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. As used herein, such terms as "1st" and "2nd," or "first" and "second" may be used to simply distinguish a corresponding component from another and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 11 illustrates an example process for EMLMR operation over the TDLS direct links or over other P2P links between peer non-AP MLDs according to various embodiments of the present disclosure;

DETAILED DESCRIPTION

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the present disclosure recognize that currently EMLMR operation is only defined for communication between an AP MLD and a non-AP MLD. The EMLMR operation for P2P communication (for example, tunneled direct link setup (TDLS)) is not defined in the current IEEE 802.11be specification. How to set up P2P links while a non-AP MLD is operating in EMLMR mode or how to utilize EMLMR mode of operations while two non-AP MLDs are communicating over the P2P or TDLS direct link needs to be defined. Moreover, the operational procedure for EMLMR for P2P communication is not defined in the current 802.11be specification. Accordingly, embodiments of the present disclosure provide methods and apparatuses that enable EMLMR operation for P2P communication between non-AP MLDs.

Figure 1:
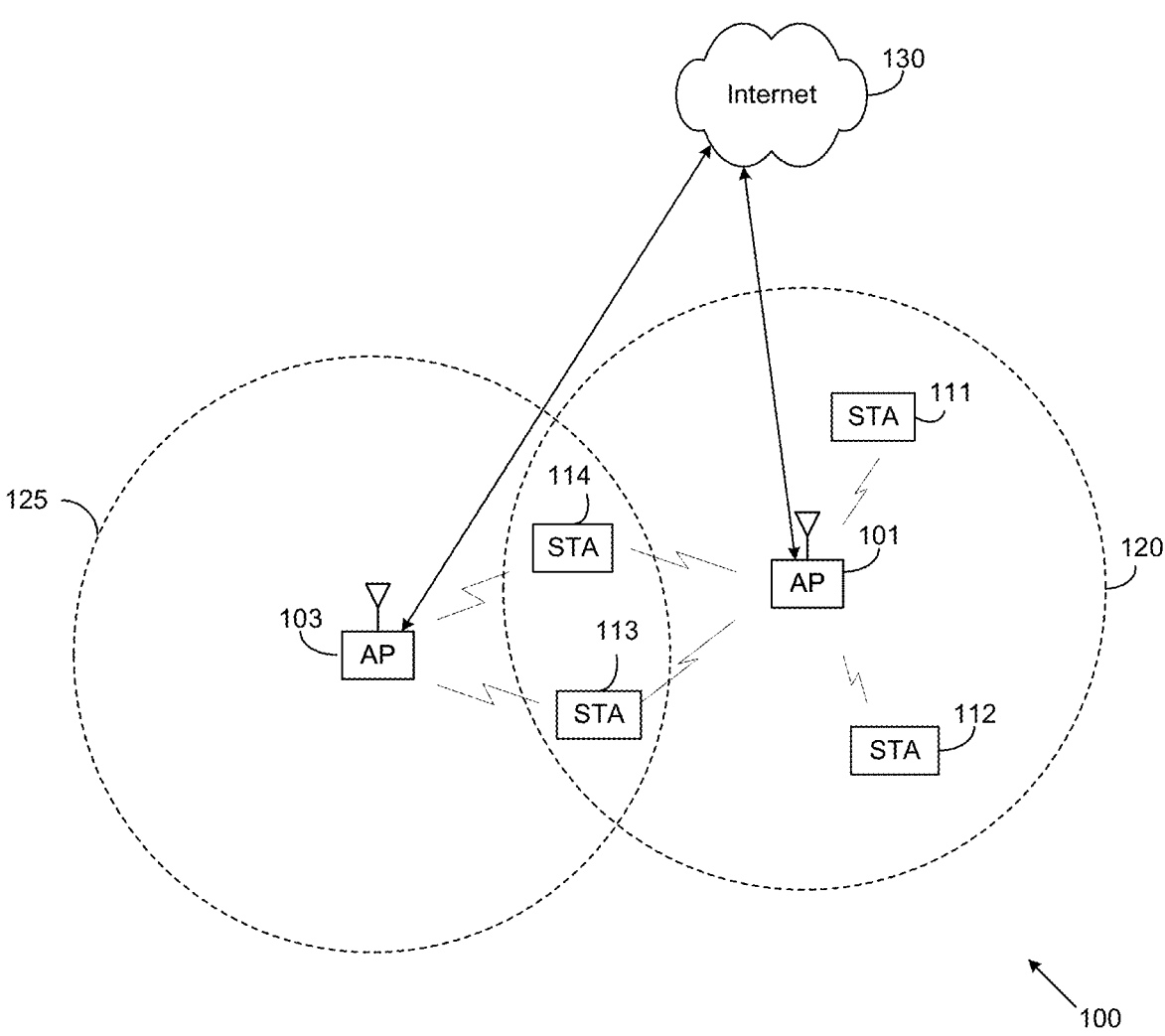
FIG. 1 illustrates an example wireless network according to various embodiments of the present disclosure.

FIG. 1 illustrates an example wireless network 100 according to various embodiments of the present disclosure. The embodiment of the wireless network 100 shown in FIG. 1 is for illustration only. Other embodiments of the wireless network 100 could be used without departing from the scope of this disclosure.

The wireless network 100 includes APs 101 and 103. The APs 101 and 103 communicate with at least one network 130, such as the Internet, a proprietary Internet Protocol (IP) network, or other data network. The AP 101 provides wireless access to the network 130 for a plurality of STAs 111-114 within a coverage area 120 of the AP 101. The APs 101-103 may communicate with each other and with the STAs 111-114 using Wi-Fi or other WLAN communication techniques.

Depending on the network type, other well-known terms may be used instead of "access point" or "AP," such as "router" or "gateway." For the sake of convenience, the term "AP" is used in this disclosure to refer to network infrastructure components that provide wireless access to remote terminals. In WLAN, given that the AP also contends for the wireless channel, the AP may also be referred to as a STA (e.g., an AP STA). Also, depending on the network type, other well-known terms may be used instead of "station" or "STA," such as "mobile station," "subscriber station," "remote terminal," "user equipment," "wireless terminal," or "user device." For the sake of convenience, the terms "station" and "STA" are used in this disclosure to refer to remote wireless equipment that wirelessly accesses an AP or contends for a wireless channel in a WLAN, whether the STA is a mobile device (such as a mobile telephone or smartphone) or is normally considered a stationary device (such as a desktop computer, AP, media player, stationary sensor, television, etc.). This type of STA may also be referred to as a non-AP STA.

In various embodiments of this disclosure, each of the APs 101 and 103 and each of the STAs 111-114 may be an MLD. In such embodiments, APs 101 and 103 may be AP MLDs, and STAs 111-114 may be non-AP MLDs. Each MLD is affiliated with more than one STA. For convenience of explanation, an AP MLD is described herein as affiliated with more than one AP (e.g., more than one AP STA), and a non-AP MLD is described herein as affiliated with more than one STA (e.g., more than one non-AP STA).

Dotted lines show the approximate extents of the coverage areas 120 and 125, which are shown as approximately circular for the purposes of illustration and explanation only. It should be clearly understood that the coverage areas associated with APs, such as the coverage areas 120 and 125, may have other shapes, including irregular shapes, depending upon the configuration of the APs and variations in the radio environment associated with natural and man-made obstructions.

As described in more detail below, one or more of the APs may include circuitry and/or programming for facilitating the use of EMLMR operation for P2P communications between MLDs in WLANs. Although FIG. 1 illustrates one example of a wireless network 100, various changes may be made to FIG. 1. For example, the wireless network 100 could include any number of APs and any number of STAs in any suitable arrangement. Also, the AP 101 could communicate directly with any number of STAs and provide those STAs with wireless broadband access to the network 130. Similarly, each AP 101-103 could communicate directly with the network 130 and provide STAs with direct wireless broadband access to the network 130. Further, the APs 101 and/or 103 could provide access to other or additional external networks, such as external telephone networks or other types of data networks.

Figure 2A:
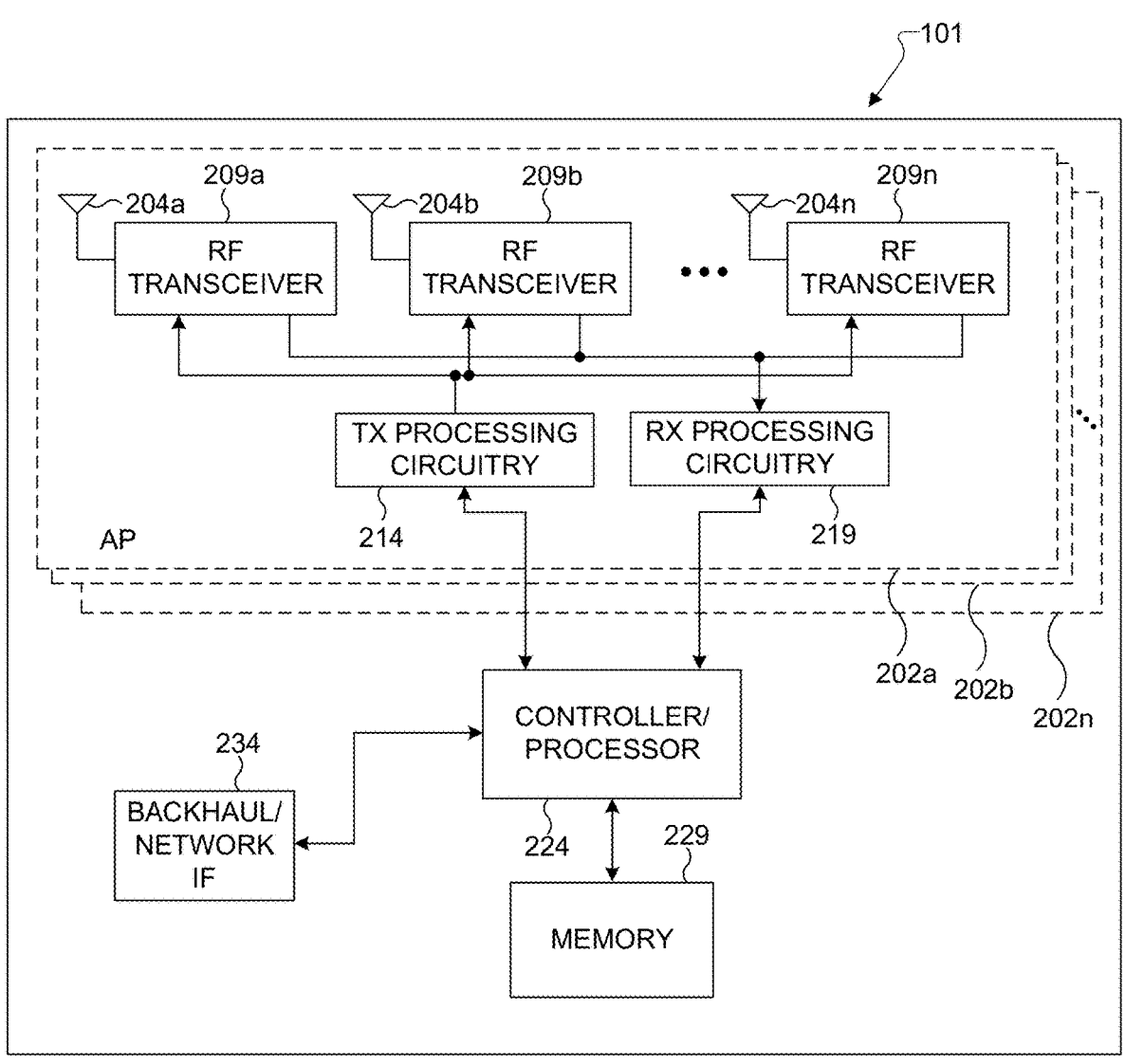
FIG. 2A illustrates an example AP according to various embodiments of the present disclosure.

FIG. 2A illustrates an example AP 101 according to various embodiments of the present disclosure. The embodiment of the AP 101 illustrated in FIG. 2A is for illustration only, and the AP 103 of FIG. 1 could have the same or similar configuration. In the embodiments discussed herein below, the AP 101 is an AP MLD. However, APs come in a wide variety of configurations, and FIG. 2A does not limit the scope of this disclosure to any particular implementation of an AP.

The AP MLD 101 is affiliated with multiple APs 202a-202n (which may be referred to, for example, as AP1-APn). Each of the affiliated APs 202a-202n includes multiple antennas 204a-204n, multiple RF transceivers 209a-209n, transmit (TX) processing circuitry 214, and receive (RX) processing circuitry 219. The AP MLD 101 also includes a controller/processor 224, a memory 229, and a backhaul or network interface 234.

The illustrated components of each affiliated AP 202a-202n may represent a physical (PHY) layer and a lower media access control (LMAC) layer in the open systems interconnection (OSI) networking model. In such embodiments, the illustrated components of the AP MLD 101 represent a single upper MAC (UMAC) layer and other higher layers in the OSI model, which are shared by all of the affiliated APs 202a-202n.

For each affiliated AP 202a-202n, the RF transceivers 209a-209n receive, from the antennas 204a-204n, incoming RF signals, such as signals transmitted by STAs in the network 100. In some embodiments, each affiliated AP 202a-202n operates at a different bandwidth, e.g., 2.4 GHz, 5 GHz, or 6 GHz, and accordingly the incoming RF signals received by each affiliated AP may be at a different frequency of RF. The RF transceivers 209a-209n down-convert the incoming RF signals to generate IF or baseband signals. The IF or baseband signals are sent to the RX processing circuitry 219, which generates processed baseband signals by filtering, decoding, and/or digitizing the baseband or IF signals. The RX processing circuitry 219 transmits the processed baseband signals to the controller/processor 224 for further processing.

For each affiliated AP 202a-202n, the TX processing circuitry 214 receives analog or digital data (such as voice data, web data, e-mail, or interactive video game data) from the controller/processor 224. The TX processing circuitry 214 encodes, multiplexes, and/or digitizes the outgoing baseband data to generate processed baseband or IF signals. The RF transceivers 209a-209n receive the outgoing processed baseband or IF signals from the TX processing circuitry 214 and up-convert the baseband or IF signals to RF signals that are transmitted via the antennas 204a-204n. In embodiments wherein each affiliated AP 202a-202n operates at a different bandwidth, e.g., 2.4 GHz, 5 GHz, or 6 GHz, the outgoing RF signals transmitted by each affiliated AP may be at a different frequency of RF.

The controller/processor 224 can include one or more processors or other processing devices that control the overall operation of the AP MLD 101. For example, the controller/processor 224 could control the reception of forward channel signals and the transmission of reverse channel signals by the RF transceivers 209a-209n, the RX processing circuitry 219, and the TX processing circuitry 214 in accordance with well-known principles. The controller/processor 224 could support additional functions as well, such as more advanced wireless communication functions. For instance, the controller/processor 224 could support beam forming or directional routing operations in which outgoing signals from multiple antennas 204a-204n are weighted differently to effectively steer the outgoing signals in a desired direction. The controller/processor 224 could also support OFDMA operations in which outgoing signals are assigned to different subsets of subcarriers for different recipients (e.g., different STAs 111-114). Any of a wide variety of other functions could be supported in the AP MLD 101 by the controller/processor 224 including facilitating the use of EMLMR operation for P2P communications between MLDs in WLANs. In some embodiments, the controller/processor 224 includes at least one microprocessor or microcontroller. The controller/processor 224 is also capable of executing programs and other processes resident in the memory 229, such as an OS. The controller/processor 224 can move data into or out of the memory 229 as required by an executing process.

The controller/processor 224 is also coupled to the backhaul or network interface 234. The backhaul or network interface 234 allows the AP MLD 101 to communicate with other devices or systems over a backhaul connection or over a network. The interface 234 could support communications over any suitable wired or wireless connection(s). For example, the interface 234 could allow the AP MLD 101 to communicate over a wired or wireless local area network or over a wired or wireless connection to a larger network (such as the Internet). The interface 234 includes any suitable structure supporting communications over a wired or wireless connection, such as an Ethernet or RF transceiver. The memory 229 is coupled to the controller/processor 224. Part of the memory 229 could include a RAM, and another part of the memory 229 could include a Flash memory or other ROM.

As described in more detail below, the AP MLD 101 may include circuitry and/or programming for facilitating the use of EMLMR operation for P2P communications between MLDs in WLANs. Although FIG. 2A illustrates one example of AP MLD 101, various changes may be made to FIG. 2A. For example, the AP MLD 101 could include any number of each component shown in FIG. 2A. As a particular example, an AP MLD 101 could include a number of interfaces 234, and the controller/processor 224 could support routing functions to route data between different network addresses. As another particular example, while each affiliated AP 202a-202n is shown as including a single instance of TX processing circuitry 214 and a single instance of RX processing circuitry 219, the AP MLD 101 could include multiple instances of each (such as one per RF transceiver) in one or more of the affiliated APs 202a-202n. Alternatively, only one antenna and RF transceiver path may be included in one or more of the affiliated APs 202a-202n, such as in legacy APs. Also, various components in FIG. 2A could be combined, further subdivided, or omitted and additional components could be added according to particular needs.

Figure 2B:
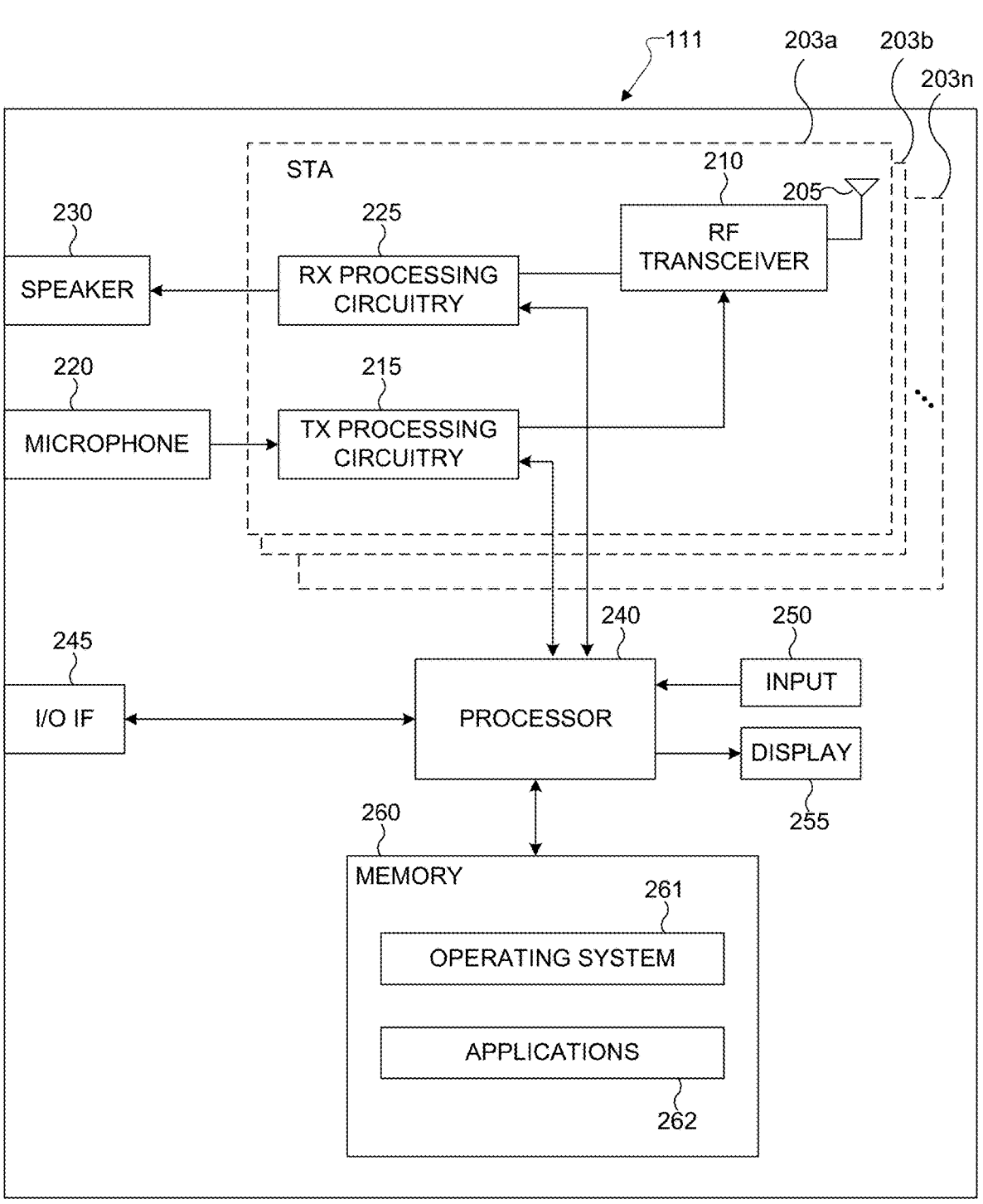
FIG. 2B illustrates an example STA according to various embodiments of this disclosure.

FIG. 2B illustrates an example STA 111 according to various embodiments of this disclosure. The embodiment of the STA 111 illustrated in FIG. 2B is for illustration only, and the STAs 111-115 of FIG. 1 could have the same or similar configuration. In the embodiments discussed herein below, the STA 111 is a non-AP MLD. However, STAs come in a wide variety of configurations, and FIG. 2B does not limit the scope of this disclosure to any particular implementation of a STA.

The non-AP MLD 111 is affiliated with multiple STAs 203a-203n (which may be referred to, for example, as STA1-STAn). Each of the affiliated STAs 203a-203n includes antenna(s) 205, a radio frequency (RF) transceiver 210, TX processing circuitry 215, and receive (RX) processing circuitry 225. The non-AP MLD 111 also includes a microphone 220, a speaker 230, a controller/processor 240, an input/output (I/O) interface (IF) 245, a touchscreen 250, a display 255, and a memory 260. The memory 260 includes an operating system (OS) 261 and one or more applications 262.

The illustrated components of each affiliated STA 203a-203n may represent a PHY layer and an LMAC layer in the OSI networking model. In such embodiments, the illustrated components of the non-AP MLD 111 represent a single UMAC layer and other higher layers in the OSI model, which are shared by all of the affiliated STAs 203a-203n.

For each affiliated STA 203a-203n, the RF transceiver 210 receives, from the antenna(s) 205, an incoming RF signal transmitted by an AP of the network 100. In some embodiments, each affiliated STA 203a-203n operates at a different bandwidth, e.g., 2.4 GHz, 5 GHz, or 6 GHz, and accordingly the incoming RF signals received by each affiliated STA may be at a different frequency of RF. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the controller/processor 240 for further processing (such as for web browsing data).

For each affiliated STA 203a-203n, the TX processing circuitry 215 receives analog or digital voice data from the microphone 220 or other outgoing baseband data (such as web data, e-mail, or interactive video game data) from the controller/processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna(s) 205. In embodiments wherein each affiliated STA 203a-203n operates at a different bandwidth, e.g., 2.4 GHz, 5 GHz, or 6 GHz, the outgoing RF signals transmitted by each affiliated STA may be at a different frequency of RF.

The controller/processor 240 can include one or more processors and execute the basic OS program 261 stored in the memory 260 in order to control the overall operation of the non-AP MLD 111. In one such operation, the main controller/processor 240 controls the reception of forward channel signals and the transmission of reverse channel signals by the RF transceiver 210, the RX processing circuitry 225, and the TX processing circuitry 215 in accordance with well-known principles. The main controller/processor 240 can also include processing circuitry configured to facilitate the use of EMLMR operation for P2P communications between MLDs in WLANs. In some embodiments, the controller/processor 240 includes at least one microprocessor or microcontroller.

The controller/processor 240 is also capable of executing other processes and programs resident in the memory 260, such as operations for facilitating the use of EMLMR operation for P2P communications between MLDs in WLANs. The controller/processor 240 can move data into or out of the memory 260 as required by an executing process. In some embodiments, the controller/processor 240 is configured to execute a plurality of applications 262, such as applications for facilitating the use of EMLMR operation for P2P communications between MLDs in WLANs. The controller/processor 240 can operate the plurality of applications 262 based on the OS program 261 or in response to a signal received from an AP. The main controller/processor 240 is also coupled to the I/O interface 245, which provides non-AP MLD 111 with the ability to connect to other devices such as laptop computers and handheld computers. The I/O interface 245 is the communication path between these accessories and the main controller 240.

The controller/processor 240 is also coupled to the touchscreen 250 and the display 255. The operator of the non-AP MLD 111 can use the touchscreen 250 to enter data into the non-AP MLD 111. The display 255 may be a liquid crystal display, light emitting diode display, or other display capable of rendering text and/or at least limited graphics, such as from web sites. The memory 260 is coupled to the controller/processor 240. Part of the memory 260 could include a random-access memory (RAM), and another part of the memory 260 could include a Flash memory or other read-only memory (ROM).

Although FIG. 2B illustrates one example of non-AP MLD 111, various changes may be made to FIG. 2B. For example, various components in FIG. 2B could be combined, further subdivided, or omitted and additional components could be added according to particular needs. In particular examples, one or more of the affiliated STAs 203a-203n may include any number of antenna(s) 205 for MIMO communication with an AP 101. In another example, the non-AP MLD 111 may not include voice communication or the controller/processor 240 could be divided into multiple processors, such as one or more central processing units (CPUs) and one or more graphics processing units (GPUs). Also, while FIG. 2B illustrates the non-AP MLD 111 configured as a mobile telephone or smartphone, non-AP MLDs can be configured to operate as other types of mobile or stationary devices.

EMLSR operation and the behavior of STAs affiliated with a non-AP MLD during EMLSR mode operation are defined in 802.11be standards. According to current specifications, if a non-AP MLD intends to operate in EMLSR mode with its associated AP MLD, a STA affiliated with the non-AP MLD sends an EML Operating Mode Notification frame (EOMNF) to its associated AP affiliated with the AP MLD with the EMLSR Mode subfield in the EML Control field of the frame set to 1, to its associated AP affiliated with the AP MLD.

Upon receiving the EML Operating Mode Notification frame from the non-AP MLD, the AP MLD can send, on any enabled link between the AP MLD and the non-AP MLD, another EML Operating Mode Notification frame with the EMLSR Mode subfield in the EML Control field of the frame set to 1. The AP affiliated with the AP MLD is expected to send the EML Operating Mode Notification frame in response to the EML Operating Mode Notification frame sent by a STA affiliated with the non-AP MLD within the timeout interval indicated in the Transition Timeout subfield in the EML Capabilities subfield in the Basic Variant Multi-Link element that is most recently exchanged between the AP MLD and the non-AP MLD.

The non-AP MLD transitions to EMLSR mode immediately after receiving the EML Operating Mode Notification frame with EMLSR Mode subfield in EML Control field set to 1 from an AP affiliated with the AP MLD, or immediately after the timeout interval indicated in the Transition Timeout subfield in the EML Capabilities field in the Basic Variant Multi-Link element elapses after the end of the last physical layer protocol data unit (PPDU) contained in the EML Operating Mode Notification frame transmitted by the non-AP MLD—whichever occurs first. Upon transitioning into the EMLSR mode of operation, all STAs affiliated with the non-AP MLD transition to active mode (or listening mode).

Figure 3:
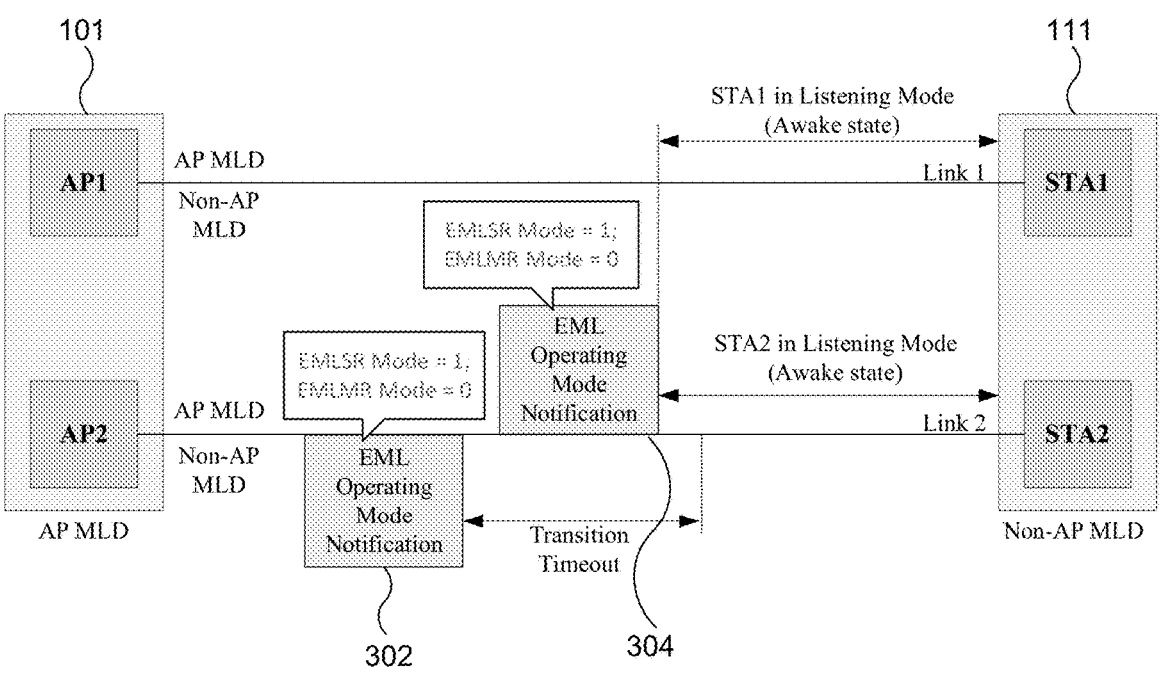
FIG. 3 illustrates an example of transitioning into EMLSR operation according to embodiments of the present disclosure.

FIG. 3 illustrates an example of transitioning into EMLSR operation according to embodiments of the present disclosure. In this example, the AP MLD may be an AP MLD 101, and the non-AP MLD may be a non-AP MLD 111. Although the AP MLD 101 is illustrated with two affiliated APs (AP1 and AP2) and the non-AP MLD 111 is illustrated as a single radio non-AP MLD with two affiliated non-AP STAs (STA1 and STA2), it is understood that this process could be applied with suitable MLDs having any number of affiliated APs or STAs. For ease of explanation, it is understood that references to an AP MLD and a non-AP MLD in further embodiments below refer to the AP MLD 101 and non-AP MLD 111, respectively.

In the example of FIG. 3, two links are set up between the AP MLD and the non-AP MLD—Link 1 between AP1 and STA1, and Link 2 between AP2 and STA2. Moreover, in this illustration, both Link 1 and Link 2 are enabled links. The non-AP MLD intends to transition to EMLSR mode, and accordingly STA2 sends to AP2 over Link 2 an EML Operating Mode Notification frame 302 with EMLSR Mode subfield in EML Control field set to 1. In response to the EML Operating Mode Notification frame 302 transmitted by the non-AP MLD, AP2 sends to STA2 another EML Operating Mode Notification frame 304 with EMLSR Mode subfield in EML Control field set to 1. After receiving the EML Operating Mode Notification frame 304 from the AP MLD, the non-AP MLD transitions into EMLSR mode, and both STA1 and STA2 transition into listening mode.

The operating procedure for a non-AP MLD in EMLMR mode is also defined in 802.11be standards. According to the current specification, the procedure for a non-AP MLD to transition into EMLMR mode is quite similar to the procedure for transitioning into EMLSR mode. If a non-AP MLD intends to operate in EMLMR mode with its associated AP MLD, a STA affiliated with the non-AP MLD sends an EML Operating Mode Notification frame to its associated AP affiliated with the AP MLD, with the EMLMR Mode subfield in the EML Control field in the EML Operating Mode Notification frame set to 1 (and with the EMLSR Mode subfield in the same frame set to 0).

Upon receiving the EML Operating Mode Notification frame from the non-AP MLD, the AP MLD can send, on any enabled link between the AP MLD and the non-AP MLD, another EML Operating Mode Notification frame with the EMLMR Mode subfield in the EML Control field in the EML Operating Mode Notification frame set to 1. The AP affiliated with the AP MLD is expected to send the EML Operating Mode Notification frame in response to the EML Operating Mode Notification frame sent by the STA affiliated with the non-AP MLD within the timeout interval indicated in the Transition Timeout subfield in EML Capabilities subfield in the Basic Variant Multi-Link element that is most recently exchanged between the AP MLD and the non-AP MLD.

The non-AP MLD transitions to EMLMR mode immediately after receiving the EML Operating Mode Notification frame with EMLMR Mode subfield in EML Control field set to 1 from an AP affiliated with the AP MLD, or immediately after the timeout interval indicated in the Transition Timeout subfield in EML Capabilities field in the Basic Variant Multi-Link element elapses after the end of last PPDU contained in the EML Operating Mode Notification frame transmitted by the non-AP MLD—whichever occurs first.

After the non-AP MLD transitions into EMLMR mode, it is the AP MLD that sends an Initial Frame to the non-AP MLD. The subsequent EMLMR frame exchanges occur on the link on which the AP MLD sends the Initial Frame. According to the current specification, the AP MLD, for EMLMR frame exchanges, shall select one of the links that are included as the EMLMR links. According to the current specification, the Initial Frame can be any frame that is sent by the AP MLD to the non-AP MLD as the first frame after the non-AP MLD transitions into EMLMR mode.

After the AP MLD sends the Initial Frame on a link, the non-AP MLD is able to operate on that link with maximum spatial stream as indicated by the values in the EMLMR Rx NSS and EMLMR Tx NSS subfields in the EML Capabilities subfield of the Common Info field of the Basic Multi-Link element. Immediately after the EMLMR frame exchange sequence is complete, the STAs affiliated with the AP MLD go back to operating with the per-stream spatial capability.

Figure 4:
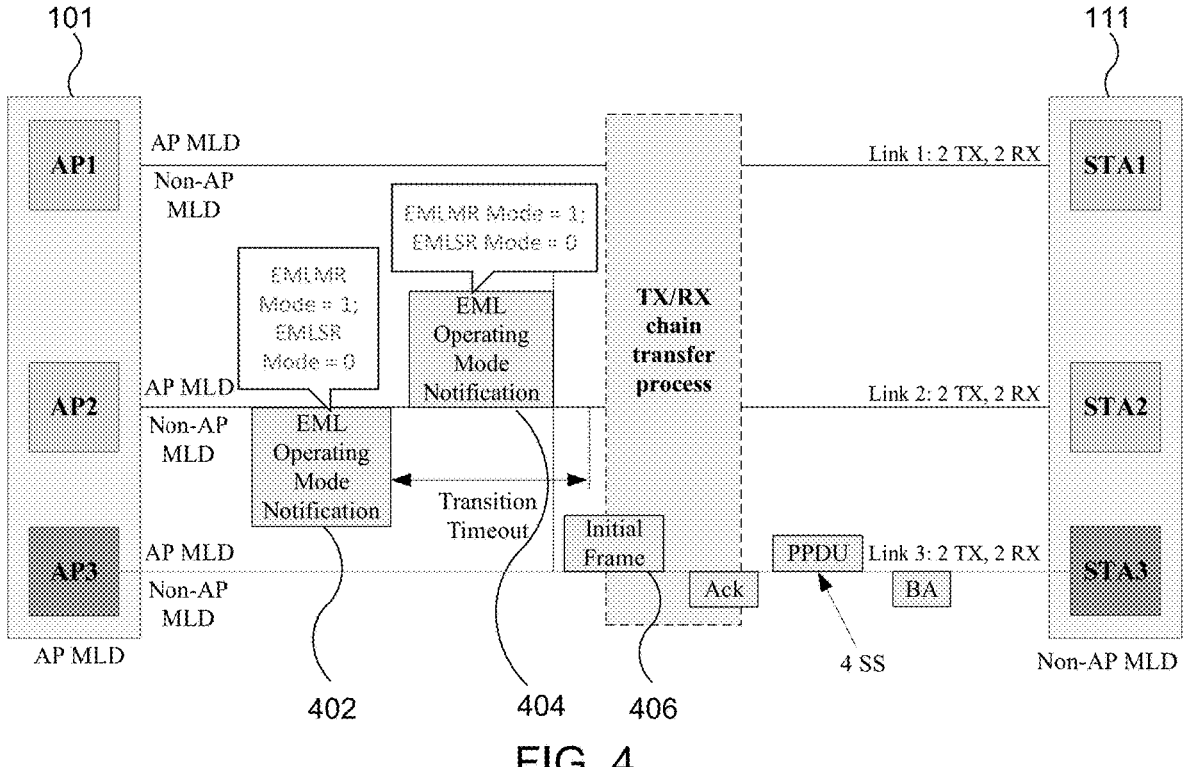
FIG. 4 illustrates an example of EMLMR operation according to embodiments of the present disclosure.

FIG. 4 illustrates an example of EMLMR operation according to embodiments of the present disclosure. In this example, the AP MLD may be an AP MLD 101, and the non-AP MLD may be a non-AP MLD 111. Although the AP MLD 101 is illustrated with three affiliated APs (AP1, AP2, and AP3) and the non-AP MLD 111 is illustrated as a multi-radio non-AP MLD with three affiliated non-AP STAs (STA1, STA2, and STA3), it is understood that this process could be applied with suitable MLDs having any number of affiliated APs or STAs.

In the example of FIG. 4, the AP MLD has three affiliated APs: AP1 operating on 2.4 GHz band, AP2 operating on 5 GHz band, and AP3 operating on 6 GHz band. The non-AP MLD has three affiliated STAs: STA1 operating on 2.4 GHz band, STA2 operating on 5 GHz band, and STA3 operating on 6 GHz band. Three links are established between the AP MLD and the non-AP MLD: Link 1 between AP1 and STA1, Link 2 between AP2 and STA2, and Link 3 between AP3 and STA3. The non-AP MLD is a multi-radio non-AP MLD, where STA1, STA2, and STA3 each have two transmit chains and two receive chains. Both the AP MLD and the non-AP MLD support EMLMR operation. The non-AP AP MLD lists all three links—Link 1, Link 2, and Link 3—as the EMLMR links. In the Basic Multi-Link element exchanged between the AP MLD and the non-AP MLD, the EML Capabilities Present subfield is set to 1 and both the EMLMR Rx NSS and EMLMR Tx NSS subfields in the EML Capabilities subfield are set to the value of 4.

When the non-AP MLD intends to enter into EMLMR mode it sends an EML Operating Mode Notification frame 402 to the AP MLD on Link 2. In EML Operating Mode Notification frame 402, the EMLMR Mode subfield in the EML Control field is set to 1 and the EMLSR Mode subfield in the EML Control field is set to 0. Upon receiving the EML Operating Mode Notification frame 402 on Link 2, AP2 affiliated with the AP MLD sends, in response, another EML Operating Mode Notification frame 404 to the non-AP MLD on Link 2 and sets the EMLMR Mode subfield in the EML Control field to 1 and EMLSR Mode subfield in the EML Control field to 0 in the EML Operating Mode Notification frame 404.

Upon receiving the EML Operating Mode Notification frame 404 from the AP MLD, which is transmitted before the timeout timer indicated in the Transition Timeout subfield in the EML Capabilities subfield in the Basic Multi-Link element expires, the non-AP MLD transitions into EMLMR mode. After the non-AP MLD transitions into EMLMR mode, the AP MLD sends the Initial Frame 406 on Link 3 to initiate frame exchanges for EMLMR operation on Link 3.

Upon receiving the Initial Frame 406 on Link 3, the non-AP MLD transfers 1 transmit chain and 1 receive chain from Link 1 to Link 3, and transfers 1 transmit chain and 1 receive chain from Link 2 to Link 3. After the transmit and receive chain transfer process is complete, Link 3 has 4 transmit chains and 4 receive chains. Therefore, STA3 affiliated with the non-AP MLD can at this point perform transmit and receive operation using 4 spatial streams on Link 3, in accordance with the value set in the EMLMR Rx NSS and EMLMR Tx NSS subfields in the EML Capabilities subfield of the Basic Multi-link element. STA3 affiliated with the non-AP MLD then sends an Ack frame in response to the initial control frame sent by the AP MLD. Accordingly, the AP MLD performs subsequent PPDU transmission to the non-AP MLD on Link 3 using 4 spatial streams. After the EMLMR frame exchange sequence, STAs affiliated with the non-AP MLD are able to perform based on per-link spatial stream capability.

According to one embodiment, if a non-AP MLD supports EMLMR operation with an AP MLD, then it can also support EMLMR operation over P2P links if the non-AP MLD supports P2P (e.g., TDLS) operation. According to another embodiment, even if a non-AP MLD supports EMLMR operation with AP MLD, that does not mean that the non-AP MLD also supports EMLMR operation over the P2P links, and vice versa.

According to some embodiments of the present disclosure, a non-AP MLD may use a separate capability indication to indicate whether the non-AP MLD supports EMLMR operation with an AP MLD and whether the non-AP MLD supports EMLMR operation for P2P communication with a peer non-AP MLD. Various embodiments of a P2P EMLMR capability indication message (e.g., a message that indicates that the first non-AP MLD supports the EMLMR mode of operation for P2P communication over P2P links) are provided herein below.

According to one embodiment, for a non-AP MLD supporting EMLMR operation with both an AP MLD and with a peer non-AP MLD, the same EMLMR parameters, such as EMLMR Delay, Transition Timeout, EMLMR Supported MCS And NSS Set, are applicable for both. According to another embodiment, different sets of EMLMR parameters are applicable for EMLMR operation with an AP MLD and with a peer non-AP MLD.

According to one embodiment, the links designated for EMLMR operation with AP MLD (i.e. EMLMR Links) are also the links applicable for EMLMR operation between two peer non-AP MLDs given that the EMLMR Links are also the P2P links (e.g., TDLS links) established between the two peer non-AP MLDs. According to another embodiment, a separate designated set of links (P2P EMLMR links) are used for EMLMR operation between two peer non-AP MLDs. According to this embodiment, EMLMR frame exchange for P2P communications occurs over the P2P EMLMR Links.

Figures 5, 6:
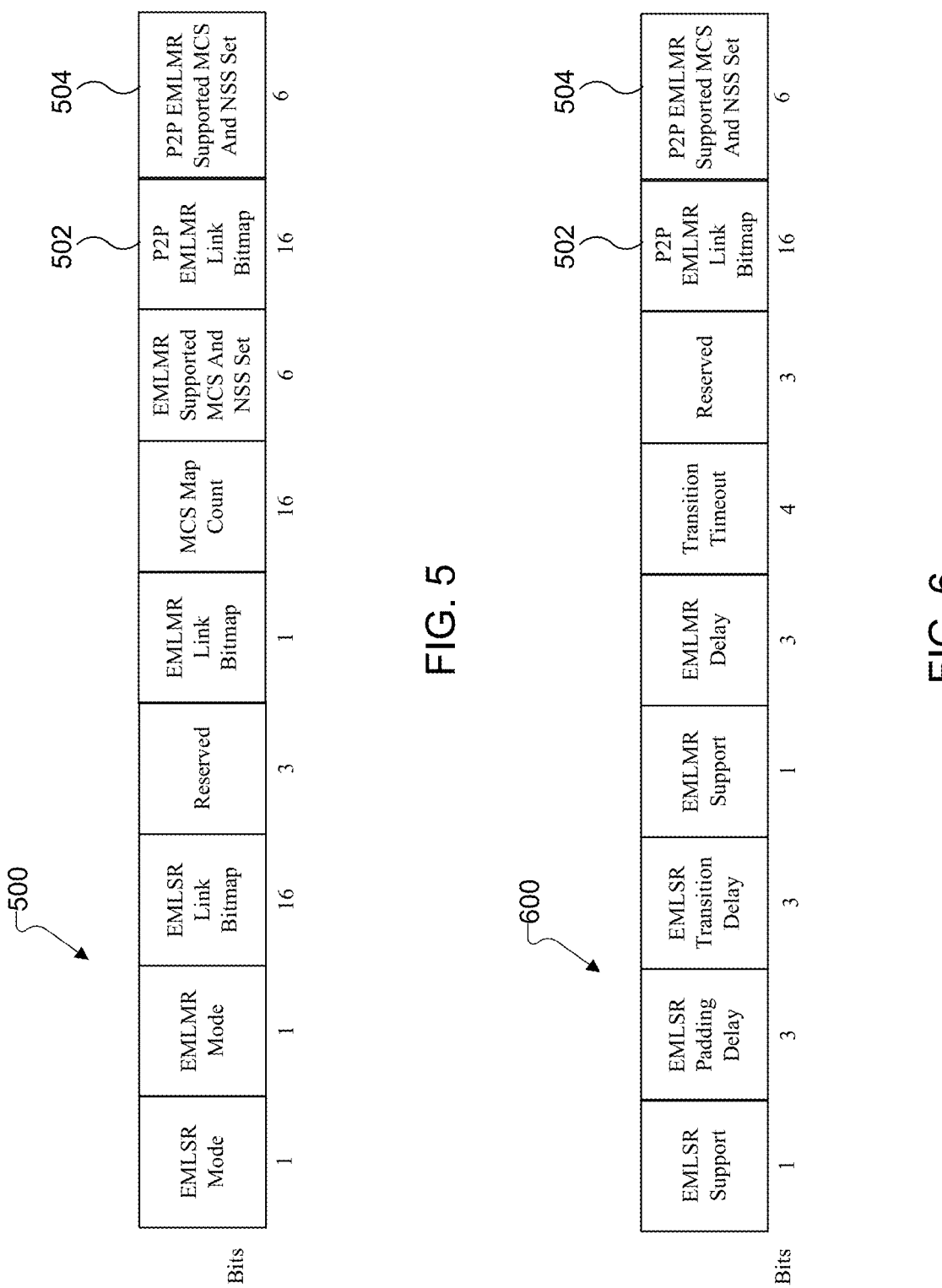
FIG. 5 illustrates an example format of an EML Control field of an EML Operating Mode Notification frame according to various embodiments of the present disclosure.
FIG. 6 illustrates an example format of an EML Capabilities subfield of the Common Info field of the Basic Multi-Link element according to various embodiments of the present disclosure.

FIG. 5 illustrates an example format of an EML Control field 500 of an EML Operating Mode Notification frame (EOMNF) according to various embodiments of the present disclosure. In this example, the P2P EMLMR Links are indicated through a P2P EMLMR Link Bitmap subfield 502 of the EML Control field 500 of the EML Operating Mode Notification frame.

According to another embodiment, the MCS Map Count parameter and EMLMR Supported MCS And NSS Set parameter can be different for EMLMR operation with an AP MLD and EMLMR operation with a peer non-AP MLD. In such an embodiment, P2P-specific fields for these parameters can be included in the EML Control field of the EML Operating Mode Notification frame. In the example of FIG. 5, a P2P EMLMR Supported MCS And NSS Set subfield 504 is included in the EML Control field 500.

According to another embodiment, the P2P EMLMR Link Bitmap subfield, P2P EMLMR Supported MCS And NSS Set subfield, and MCS Map Count subfield can also be included in the EML Capabilities subfield in the Common Info field of the Basic Multi-Link element. According to another embodiment, an EMLMR Delay subfield and a Transition Timeout subfield can be included in the EML Capabilities subfield in the Common Info field of the Basic Multi-Link element.

FIG. 6 illustrates an example format of an EML Capabilities subfield 600 of the Common Info field of the Basic Multi-Link element according to various embodiments of the present disclosure. In this embodiment, the EML Capabilities subfield 600 includes the P2P EMLMR Link Bitmap subfield 502 and the P2P EMLMR Supported MCS And NSS Set subfield 504.

According to another embodiment, the end of an EMLMR frame exchange over a P2P link can be indicated in a similar way as the end of an EMLMR frame exchange between an AP MLD and a non-AP MLD.

According to some embodiments of the present disclosure, EMLMR operation can take place between two non-AP MLDs when multiple P2P or TDLS links are set up between the two non-AP MLDs. Various embodiments of EMLMR operation for P2P communication are provided herein below.

According to one embodiment in which there are multiple TDLS links (or other P2P links) set up between two non-AP MLDs that support EMLMR operation over the TDLS links or other P2P links, either one of the non-AP MDs (e.g., the first non-AP MLD) is allowed to indicate a transition into EMLMR mode to its peer non-AP MLD (e.g., the second non-AP MLD) for P2P communication by sending an EMLMR transition request (such as an EML Operating Mode Notification frame with the EMLMR Mode subfield in the EML Control field set to 1) to the peer non-AP MLD over any of the TDLS links or other P2P links established between the two peer non-AP MLDs. The peer non-AP MLD that receives the request to transition into EMLMR mode can send a corresponding response frame indicating the acceptance or other response to the received EMLMR transition request for EMLMR operation over the P2P link.

According to one embodiment, when the EML Operating Mode Notification frame is used to indicate the request or response to transition into EMLMR mode, upon receiving the EML Operating Mode Notification frame from a non-AP MLD (e.g., the first non-AP MLD) with EMLMR Mode subfield set to 1, the recipient peer non-AP MLD (e.g., the second non-AP MLD) can respond by sending another EML Operating Mode Notification frame with EMLMR Mode subfield in EML Control field set to 1 within the timeout interval indicated in the Transition Timeout subfield in EML Capabilities subfield in the Common Info field of the Basic Multi-link element starting at the end of the PPDU transmitted by the second non-AP MLD over any of the set up peer-to-peer links between the two non-AP MLDs as an acknowledgement to the EML Operating Mode Notification frame transmitted by the first non-AP MLD over any of the set up P2P links between the two non-AP MLDs. Immediately after sending this response frame or after the timer indicated in the Transition Timeout subfield expires, whichever event occurs first, both peer non-AP MLDs will transition into EMLMR mode for P2P communication and the EMLMR links that are also P2P links shall transition into listening mode.

Figure 7:
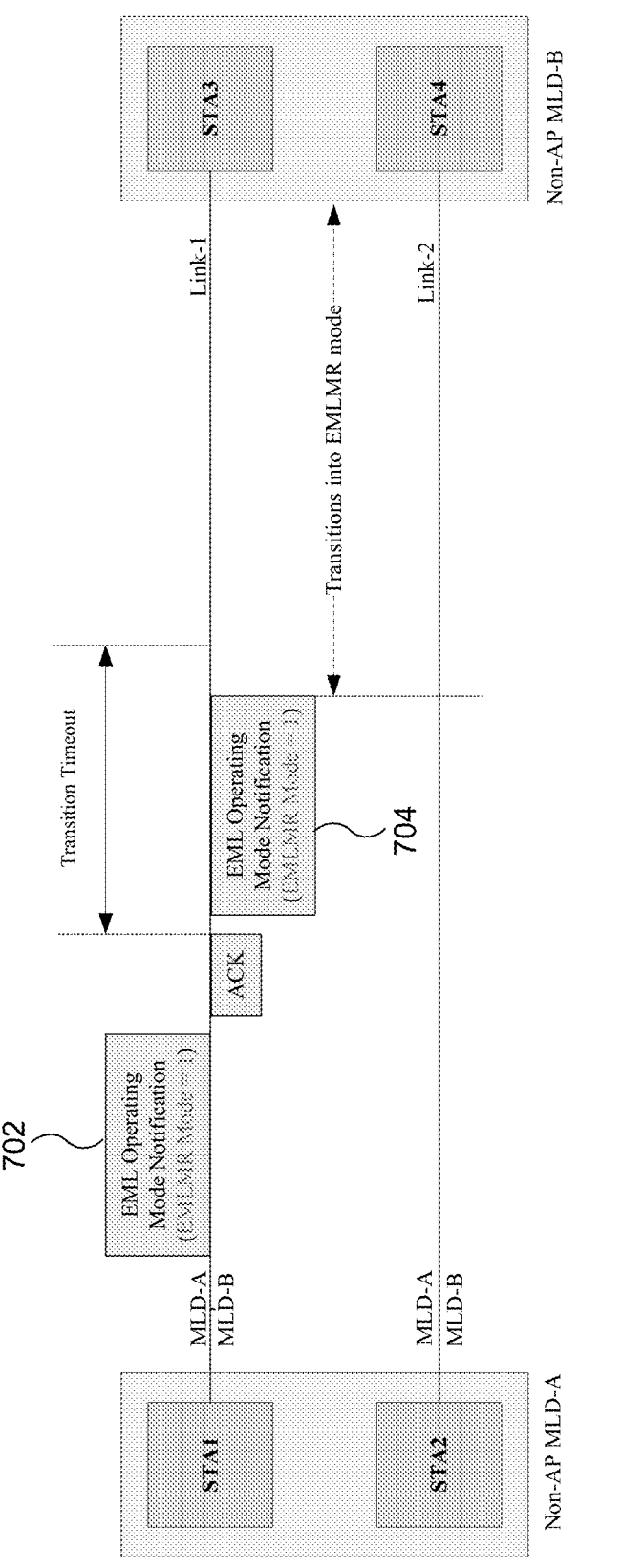
FIG. 7 illustrates an example of transitioning into EMLMR mode over P2P links between two non-AP MLDs using EML Operating Mode Notification frames according to various embodiments of the present disclosure.

FIG. 7 illustrates an example of transitioning into EMLMR mode over P2P links between two non-AP MLDs using EML Operating Mode Notification frames according to various embodiments of the present disclosure. FIG. 7 illustrates two peer non-AP MLDs, non-AP MLD-A and non-AP MLD-B. STA1 and STA2 are two non-AP STAs affiliated with non-AP MLD-A. STA3 and STA4 are two non-AP STAs affiliated with non-AP MLD-B. STA1 and STA3 are associated with AP1 affiliated with an AP MLD, AP MLD-1 (not shown) and are operating on Link 1. STA2 and STA4 are associated with AP2 affiliated with the same AP MLD-1, and are operating on Link 2. There are, for example, two TDLS links (or other P2P links) set up between non-AP MLD-A and non-AP MLD-B—Link 1 between STA1 and STA3, and Link 2 between STA2 and STA4.

While operating over the P2P link, STA1 sends an EML Operating Mode Notification frame 702 to STA3 with EMLMR Mode subfield in the EML Control field set to 1 in order to indicate non-AP MLD-A's intention to transition into EMLMR mode for peer-to-peer communication. Within the timeout interval indicated by the Transition Timeout subfield in EML Capabilities subfield in the Common Info field of the Basic Multi-Link element, STA3 responds to the EML Operating Mode Notification frame 702 received from STA1 by sending another EML Operating Mode Notification frame 704 to STA1 with EMLMR Mode subfield in the EML Control field set to 1 over a peer-to-peer link. Upon transmission of the EML Operating Mode Notification frame from STA3, non-AP MLD-A and non-AP MLD-B both transition into EMLMR mode for peer-to-peer communication.

According to another embodiment in which there are multiple TDLS links (or other P2P links) set up between two non-AP MLDs that support EMLMR operation over the TDLS links or other P2P links, only one of the two non-AP MDs (e.g., the first non-AP MLD) is allowed to indicate a transition into EMLMR mode to its peer non-AP MLD (e.g., the second non-AP MLD) for P2P communication by sending a request indication frame (such as an EML Operating Mode Notification frame with EMLMR Mode subfield in EML Control field set to 1) to the peer non-AP MLD over any of the TDLS links or other P2P links established between the two peer non-AP MLDs.

According to one such embodiment, which of the two non-AP MLDs is allowed to make such indication to transition into EMLMR mode or transition out from EMLMR mode (e.g., by sending an indication frame such as an EML Operating Mode Notification frame with EMLMR Mode subfield in EML Control field set to 0 to the peer non-AP MLD over any of the TDLS links or other P2P links established between the two peer non-AP MLDs) is based on relative capabilities of the two peer non-AP MLDs. For example, if one non-AP MLD is simultaneous transmit and receive (STR) capable and the other peer non-AP MLD is NSTR constrained, then the non-AP MLD with STR capability will be the one that is allowed indicate to transition into or transition out from EMLMR mode to its peer non-AP MLD. This would be an implicit signaling between the two non-AP MLD supporting EMLMR mode for P2P communication.

According to another such embodiment, which of the two non-AP MLDs is allowed to make such indication to transition into EMLMR mode or transition out from EMLMR mode is indicated in P2P EMLMR Capabilities elements that are exchanged between the two peer non-AP MLDs during the TDLS discovery and setup process (or other P2P link setup process). In some embodiments, this negotiation may occur when both peer non-AP MLDs are NSTR constrained.

Figure 8:
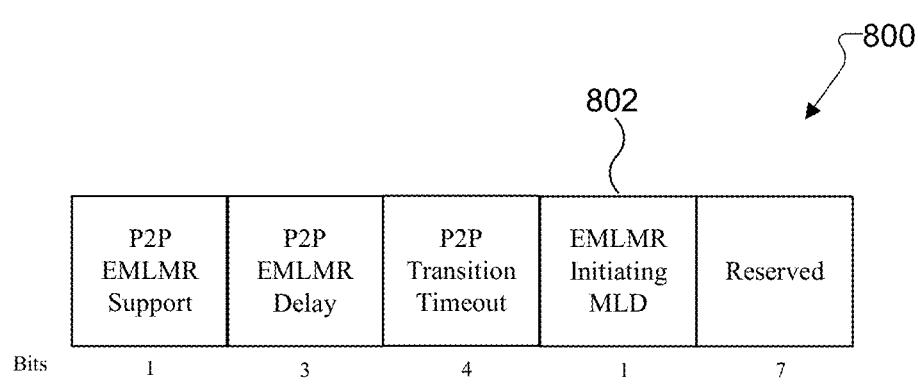
FIG. 8 illustrates an example format of a P2P EMLMR Capabilities element according to various embodiments of the present disclosure.

FIG. 8 illustrates an example format of a P2P EMLMR Capabilities element 800 according to various embodiments of the present disclosure. In FIG. 8, the definitions of the P2P EMLMR Support subfield, P2P EMLMR Delay subfield, and P2P Transition Timeout subfield in the P2P EMLMR Capabilities element are the same as those described herein below with respect to FIG. 12. It is understood, however, that other formats may also be used.

The EMLMR Initiating MLD subfield 802 in the P2P EMLMR Capabilities element 800 indicates whether or not the peer non-AP MLD transmitting the element intends to be the initiator MLD for transitioning into or transitioning out from the EMLMR mode for P2P communications. If the EMLMR Initiating MLD subfield is set to 1 by the non-AP MLD that transmits the corresponding P2P EMLMR Capabilities element, it indicates that the non-AP MLD intends to be the EMLMR initiating MLD. Otherwise, the transmitting non-AP MLD may not intend to be the EMLMR initiating MLD.

According to one embodiment in which there are multiple TDLS links (or other P2P links) set up between two non-AP MLDs, one non-AP MLD supporting EMLMR operation for P2P communication may not initiate the process of transitioning into EMLMR mode for P2P communication if its peer non-AP MLD does not support the EMLMR operation for P2P communication.

According to one embodiment in which there are multiple TDLS links (or other P2P links) set up between two non-AP MLDs supporting EMLMR operation over TDLS direct links or other P2P links and either of the two peer non-AP MLDs can be the initiator of the process of transitioning into EMLMR mode, in order to reduce the probability that both peer non-AP MLDs issue the EML Operating Mode Notification frame as a request for transitioning into EMLMR mode over TDLS direct links at more or less the same time (there is at least one random back-off between the two issuance), a TDLS peer non-AP MLD (e.g., the first non-AP MLD) should not transmit an EML Operating Mode Notification frame as an EMLMR transitioning request if the first non-AP MLD received another EML Operating Mode Notification frame as an EMLMR transitioning request from its peer non-AP MLD (e.g., the second non-AP MLD) and no EML Operating Mode Notification frame has been transmitted by the first non-AP MLD as the response frame to the second non-AP MLD's request to transition into EMLMR mode.

Once two TDLS peer non-AP MLDs supporting EMLMR operation for P2P communications transition into EMLMR mode for P2P communications, in order to select the link on which the P2P EMLMR frame exchange will happen, according to one embodiment, either of the two TDLS peer non-AP MLDs can send a specific frame—a P2P EMLMR-Start frame—to its peer non-AP MLD as an indication of the chosen link for the P2P EMLMR frame exchanges. For example, the link on which the P2P EMLMR-Start frame is sent is indicated as the chosen link for the P2P EMLMR frame exchanges. Upon reception of the P2P EMLMR-Start frame, the recipient peer non-AP MLD may issue an Ack frame as a response.

Figure 9:
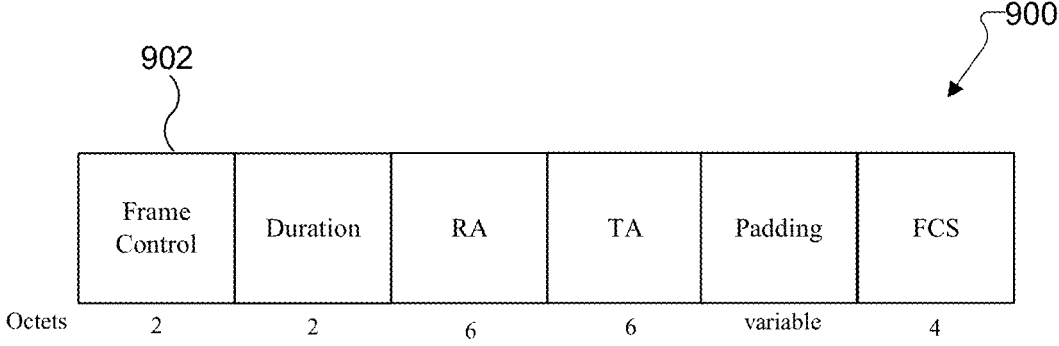
FIG. 9 illustrates an example format of a P2P EMLMR-Start frame according to various embodiments of the present disclosure.

FIG. 9 illustrates an example format of a P2P EMLMR-Start frame 900 according to various embodiments of the present disclosure. In the example of FIG. 9, the format of the Frame Control field 902 is the same as that defined in the current specification for any Control frame.

According to one embodiment, the Type subfield (bits B3 and B2) and Subtype subfield (bits B7, B6, B5, and B4) of the Frame Control field 902 of the P2P EMLMR-Start frame 900 are set as 01 and 1111, respectively, to indicate that the Control frame is a P2P EMLMR-Start frame. An example of valid combinations of the Type subfield and Subtype subfield is shown in Table 1. Other possible combinations for the Type and Subtype subfields are <Type value=01, Subtype value=0000> and <Type value=01, Subtype value=0001>.

TABLE 1

| Type value | | Subtype value | |
| B3 B2 | Type description | B7 B6 B5 B4 | Subtype description |
| --- | --- | --- | --- |
| . | . | . | . |
| . | . | . | . |
| . | . | . | . |
| 01 | Control | 1101 | Ack |
| 01 | Control | 1110 | CF-End |
| 01 | Control | 1111 | P2P EMLMR-Start |
| 10 | Data | 0000 | Data |
| . | . | . | . |
| . | . | . | . |
| . | . | . | . |

The definitions of the Duration field, RA field, TA field, and FCS field are the same as defined in the current specification.

The Padding field is optionally present in the P2P EMLMR-Start frame to extend the frame length in order to give the recipient of the frame enough time to prepare a response for transmission a short inter-frame spacing (SIFS) after the P2P EMLMR-Start frame is received. The Padding field, if present, is at least two octets in length and is set to all 1s, according to one embodiment, or is set to all 0s, according to another embodiment.

According to another embodiment, the MAC padding duration of the P2P EMLMR-Start frame 900 is such that it satisfies the delay requirement for EMLMR link switching as indicated by the EML Capabilities subfield of the Common Info field of the Basic Multi-Link element.

According to another embodiment, any frame that satisfies the MAC padding duration requirement for EMLMR link switching can be used for initiating the EMLMR frame exchange over a TDLS link or a P2P link between two peer non-AP MLDs.

According to one embodiment in which there are multiple TDLS links (or other P2P links) set up between two non-AP MLDs that support EMLMR operation for P2P communications over the TDLS direct links and in which both peer non-AP MLDs have successfully transitioned into EMLMR mode for P2P communication, only one of the two peer non-AP MLDs (e.g., the first non-AP MLD) is allowed send the P2P EMLMR-Start frame (or any other frame satisfying the minimum MAC padding duration requirement for EMLMR link switching) to its peer non-AP MLD to indicate the link selected for P2P EMLMR frame exchanges.

According to one such embodiment, which of the two peer non-AP MLDs is allowed to send the initiating frame as an indication of the link selected for P2P EMLMR frame exchanges is based on the relative capabilities of the two peer non-AP MLDs. For example, if one non-AP MLD is STR capable and the other peer non-AP MLD is NSTR constrained, then the non-AP MLD with STR capability will be the one that can send the initiating frame to indicate the link selected for P2P EMLMR frame exchanges over the P2P link.

According to another such embodiment, which of the two non-AP MLDs is allowed to send the initiating frame as an indication for the link selected for P2P EMLMR frame exchanges is indicated in the P2P EMLMR Capabilities elements that are exchanged between the two peer non-AP MLDs during the TDLS discovery and setup process.

Figure 10:
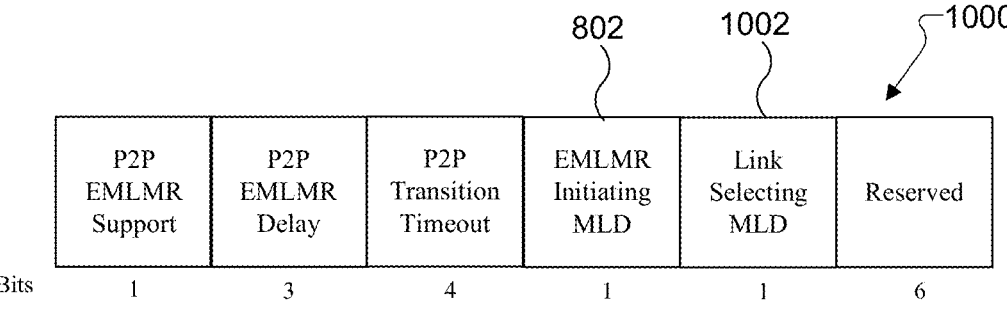
FIG. 10 illustrates an example format of a P2P EMLMR Capabilities element according to various embodiments of the present disclosure.

FIG. 10 illustrates an example format of a P2P EMLMR Capabilities element 1000 according to various embodiments of the present disclosure. In FIG. 10, the definitions of the P2P EMLMR Support subfield, P2P EMLMR Delay subfield, and P2P Transition Timeout subfield in the P2P EMLMR Capabilities element are the same as those described herein below with respect to FIG. 12, and the definition of the EMLMR Initiating MLD subfield 802 is the same as that described above with respect to FIG. 8. It is understood, however, that other formats may also be used.

The Link Selecting MLD subfield 1002 in the P2P EMLMR Capabilities element 1000 indicates whether or not the peer non-AP MLD transmitting the element intends to be the MLD that selects the link for P2P EMLMR frame exchanges. If the Link Selecting MLD subfield 1002 is set to 1 by the non-AP MLD that transmits the corresponding P2P EMLMR Capabilities element, it indicates that the non-AP MLD intends to be the EMLMR link selecting MLD. Otherwise, the transmitting non-AP MLD will not be the EMLMR link selecting MLD.

According to one embodiment, in reference to FIG. 8 and FIG. 10, if the EMLMR Initiating MLD subfield 802 in the P2P EMLMR Capabilities element is set to 1, the peer non-AP MLD for which the TDLS Discovery Request frame or TDLS Setup Request frame is intended may not also set the EMLMR Initiating MLD subfield 802 to 1 in the P2P EMLMR Capabilities element contained in the corresponding TDLS Discovery Response frame or TDLS Setup Response frame. According to another embodiment, if the EMLMR Initiating MLD subfield 802 in the P2P EMLMR Capabilities element contained in a TDLS Discovery Request frame or TDLS Setup Request frame is set to 0, the peer non-AP MLD for which the TDLS Discovery Request frame or TDLS Setup Request frame is intended may not also set the EMLMR Initiating MLD subfield 802 to 0 in the P2P EMLMR Capabilities element contained in the corresponding TDLS Discovery Response frame or TDLS Setup Response frame. According to yet another embodiment, if the EMLMR Initiating MLD subfield 802 in the P2P EMLMR Capabilities element is set to the same value in the TDLS Discovery Request frame/TDLS Setup Request frame and the corresponding TDLS Discovery Response frame/ TDLS Setup Response frame, it would indicate that either of the two peer non-AP MLD can initiate the process of transitioning into and transitioning out from EMLMR mode for peer-to-peer communication. According to another embodiment, if the EMLMR Initiating MLD subfield 802 in the P2P EMLMR Capabilities element is set to the same value in the TDLS Discovery Request frame/TDLS Setup Request frame and the corresponding TDLS Discovery Response frame/TDLS Setup Response frame, the TDLS setup process is not successful—the TDLS responding non-AP MLD will send the TDLS Setup Response frame to the TDLS initiating non-AP MLD with the Status Code not equal to SUCCESS and the TDLS initiating non-AP MLD, upon reception of the TDLS Setup Response frame with Status Code not equal to SUCCESS, will terminate the TDLS setup procedure and will discard the TDLS Setup Response frame. According to another embodiment, similar setting and interpretation in the frame exchanges also applies to the Link Selecting MLD subfield 1002 in FIG. 10.

According to one embodiment, if a non-AP MLD (e.g., the first non-AP MLD) has already transitioned into EMLMR mode for communication with its associated AP MLD and if the non-AP MLD then intends to establish a TDLS direct link (or any other P2P link) with another peer non-AP MLD (e.g., the second non-AP MLD) or a peer STA, then the STA affiliated with the first non-AP MLD and operating on the EMLMR link for frame exchanges with its associated AP affiliated with the AP MLD sends the TDLS Discovery Request frame to its associated AP MLD as part of the EMLMR frame exchange sequence. Upon reception of the TDLS Discovery Request frame, the AP MLD then reroutes the TDLS Discovery Request frame to the intended peer non-AP MLD (the second non-AP MLD) or the intended peer STA. Subsequent TDLS Setup Request frame and TDLS Setup response frame exchanges can occur over the TDLS direct link.

According to one embodiment, for EMLMR operation between two peer non-AP MLDs over the peer-to-peer links, the EMLMR delay values (namely, EMLMR Delay, Transition Timeout value) that would be in effect for EMLMR operation between the two peer non-AP MLDs over the peer-to-peer links is the maximum of the two values in the delay sets corresponding to the two peer non-AP MLDs. For example, if two non-AP MLDs, non-AP MLD-A and non-AP MLD-B, have established the TDLS direct links and intends to operate in EMLMR mode over the TDLS direct links, and if non-AP MLD-A has set the required padding delay for the P2P EMLMR-Start frame (indicated in the EMLMR Padding Delay subfield in a Basic Multi-Link element or P2P EMLMR Capabilities element) as 16 μs and non-AP MLD-B has set the corresponding padding delay value as 32 μs, then the minimum padding delay value for the P2P EMLMR-Start frame that would be in effect for EMLMR operation over the TDLS direct links between the two peer non-AP MLDs is 32 μs.

FIG. 11 illustrates an example process 1100 for EMLMR operation over the TDLS direct links or over other P2P links between peer non-AP MLDs according to various embodiments of the present disclosure.

In order to be able to perform EMLMR operation for TDLS (or other P2P) communication between two peer non-AP MLDs, both peer non-AP MLDs can support EMLMR operation. For EMLMR operation between an AP MLD and a non-AP MLD, the support for EMLMR operation is indicated in the EMLMR Support subfield in the EML Capabilities subfield in the Common Info field of a Basic Multi-link element. When a peer non-AP MLD intends to operate in EMLMR mode with another peer non-AP MLD for P2P communication over the TDLS (or other P2P) links, both peer non-AP MLDs should be aware of each other's EMLMR capabilities. Transmission of a Multi-Link element or any other potential elements that can convey the EMLMR capability information may be incorporated with the TDLS discovery/setup process in order to indicate the EMLMR capabilities of the TDLS peer non-AP MLDs.

According to one embodiment, in order to indicate support for the EMLMR operation for P2P communications, the TDLS Discovery Response Action frame can include a P2P EML Capabilities element. This has less overhead than the Multi-Link element based approach. Table 2 includes a format for such a TDLS Discovery Response Action frame.

TABLE 2

| Order | Information | Notes |
|---|---|---|
| \<Last assigned + 1\> | EHT Capabilities | The EHT Capabilities element is present if dot11EHTOption-Implemented is true; otherwise it is not present. |
| \<Last assigned + 2\> | P2P EMLMR Capabilities | The P2P EMLMR Capabilities element is present if the STA transmitting the TDLS Discovery Response frame is affiliated with an MLD and the MLD sets the dot11EMLMROptionImplemented equal to true. Otherwise, the P2P EMLMR Capabilities element is not present. |

Figure 12:
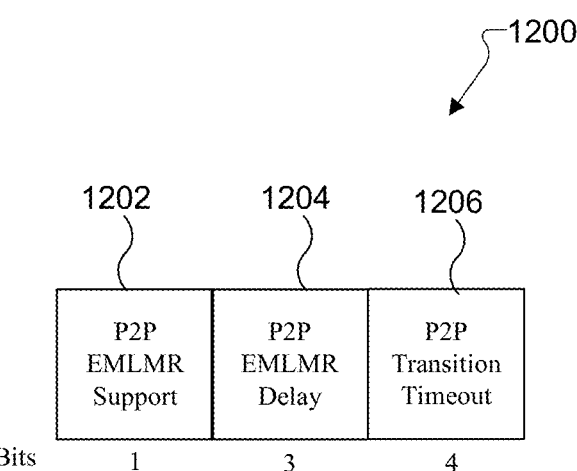
FIG. 12 illustrates an example format of a P2P EMLMR Capabilities element according to various embodiments of the present disclosure.

FIG. 12 illustrates an example format of a P2P EMLMR Capabilities element 1200 according to various embodiments of the present disclosure. It is understood that other formats are also possible (e.g., the formats of FIGS. 8 and 10).

The P2P EMLMR Support subfield 1202 indicates support of the EMLMR operation by a non-AP MLD over TDLS direct links or other P2P direct links with another peer non-AP MLD. The P2P EMLMR Support subfield 1202 is set to 1 if the MLD supports the EMLMR operation during TDLS or other P2P communication with another peer non-AP MLD, otherwise it is set to 0.

The P2P EMLMR Delay subfield 1204 indicates the minimum MAC padding duration of the initial frame for EMLMR link switching as requested by the non-AP MLD that transmits the element for EMLMR operation over a TDLS or other P2P direct link with another peer non-AP MLD. An encoding for the P2P EMLMR Padding Delay subfield 1204 value is shown in Table 3. It is understood that other possible encodings for this subfield are also possible.

TABLE 3

| P2P EMLMR Padding Delay subfield value | EMLMR padding delay for P2P operation |
|---|---|
| 0 | 0 μs |
| 1 | 16 μs |
| 2 | 32 μs |
| 3 | 64 μs |
| 4 | 128 μs |
| 5 | 256 μs |
| 6-7 | Reserved |

The P2P Transition Timeout subfield 1206 indicates the timeout value for EML Operating Mode Notification frame exchange in EMLMR mode during TDLS communication or other P2P communication between two peer non-AP MLDs. The P2P Transition Timeout subfield 1206 is 4 bits long. An encoding for the value in this field is shown in Table 4.

TABLE 4

| P2P Transition Timeout subfield value | Transition timeout for P2P communication |
|---|---|
| 0 | 0 TUs |
| 1 | 128 μs |
| 2 | 256 μs |
| 3 | 512 μs |
| 4 | 1 TU |
| 2 | 2 TUs |
| 3 | 4 TUs |
| 4 | 8 TUs |
| 5 | 16 TUs |
| 6 | 32 TUs |
| 70 | 64 TUs |
| 8 | 128 TUs |
| 9-15 | Reserved |

According to another embodiment, in order to indicate support for the EMLMR operation for TDLS or other P2P communication, the TDLS Setup Request Action frame can include the EML Capabilities element. A proposed format (with less overhead than the Multi-Link element based approach) for such a TDLS Setup Request Action frame is shown in Table 5.

TABLE 5

| Order | Information | Notes |
|---|---|---|
| 19 | AID | The AID element containing the AID of the STA or non-AP MLD whose affiliated STA is sending the frame is present if dot11VHTOptionImplemented, dot 11HEOptionImplemented, dot11EHTOptionImplemented or dot11S1GOption-Implemented is true. |
| <Last assigned + 1> | EHT Capabilities | The EHT Capabilities element is present if dot11EHTOption-Implemented is true; otherwise it is not present. |
| <Last assigned + 2> | P2P EMLMR Capabilities | The P2P EMLMR Capabilities element is present if the STA transmitting the TDLS Setup Request frame is affiliated with an MLD and the MLD sets the dot11EMLMROptionImplemented equal to true. Otherwise, the P2P EMLMR Capabilities element is not present. |

According to another embodiment, in order to indicate support for the EMLMR operation for TDLS or other P2P communication, the TDLS Setup Response Action frame can include the EML Capabilities element. A proposed format (with less overhead than the Multi-Link element-based approach) for such a TDLS Setup Response Action frame is shown in Table 6.

TABLE 6

| Order | Information | Notes |
|---|---|---|
| 20 | AID | The AID element containing the AID of the STA or non-AP MLD whose affiliated STA is sending the frame is present if dot11VHTOptionImplemented, dot11HEOptionImplemented, dot11EHTOptionImplemented or dot11S1GOption-Implemented is true and the Status Code is SUCCESS and not present otherwise. |
| <Last assigned + 1> | EHT Capabilities | The EHT Capabilities element is present if dot11EHTOption-Implemented is true; otherwise it is not present. |
| <Last assigned + 2> | P2P EMLMR Capabilities | The P2P EMLMR Capabilities element is present if the STA transmitting the TDLS Setup Response frame is affiliated with an MLD and the MLD sets the dot11EMLMROptionImplemented equal to true. Otherwise, the P2P EMLMR Capabilities element is not present. |

According to another embodiment, in order to indicate support for the EMLMR operation for TDLS or other P2P communication, the TDLS Setup Confirm Action frame can include the EML Capabilities element. A proposed alternative format (with less overhead than the Multi-Link element based-approach) for such a TDLS Setup Response Action frame is shown in Table 7.

TABLE 7

| Order | Information | Notes |
|---|---|---|
| <Last assigned + 1> | EHT Operation | The EHT Operation element is present when dot11EHTOption-Implemented is true, the TDLS Setup Response frame contained an EHT Capabilities element, and the Status Code is SUCCESS; otherwise it is not present. The EHT Operation element is defined in 9.4.2.311 (EHT Operation element). |

TABLE 7-continued

| Order | Information | Notes |
|---|---|---|
| <Last assigned + 2> | P2P EMLMR Capabilities | The P2P EMLMR Capabilities element is present if the STA transmitting the TDLS Setup Confirm frame is affiliated with an MLD and the MLD sets the dot11EMLMROptionImplemented equal to true. Otherwise, the P2P EMLMR Capabilities element is not present. |

According to one embodiment, a non-AP MLD that supports the EMLMR mode of operation can indicate the transition into EMLMR mode in one of the following ways:

(A) the indication can be for transitioning into the EMLMR mode of operation with the AP MLD with which the non-AP MLD is associated, where the AP MLD also supports the EMLMR mode of operation, or (B) the indication can be for transitioning into the EMLMR mode of operation with another peer non-AP MLD that also supports the EMLMR mode of operation, or (C) the indication can be for transitioning into the EMLMR mode of operation with both the AP MLD with which the non-AP MLD is associated and another peer non-AP MLD.

For the scenario in which the EMLMR mode of operation is for communication with both the AP MLD with which the non-AP MLD is associated and another peer non-AP MLD (i.e., scenario (C) above), according to one embodiment, the EMLMR links for EMLMR operation between the AP MLD and the non-AP MLD and the EMLMR links for EMLMR operation between two non-AP MLD over established TDLS direct links can be separate. According to one such embodiment, a non-AP MLD can use one EML Operating Mode Notification frame to transition into EMLMR mode for EMLMR frame exchanges with both AP MLD and another non-AP MLD over the TDLS (or other P2P) direct link.

Figure 13:
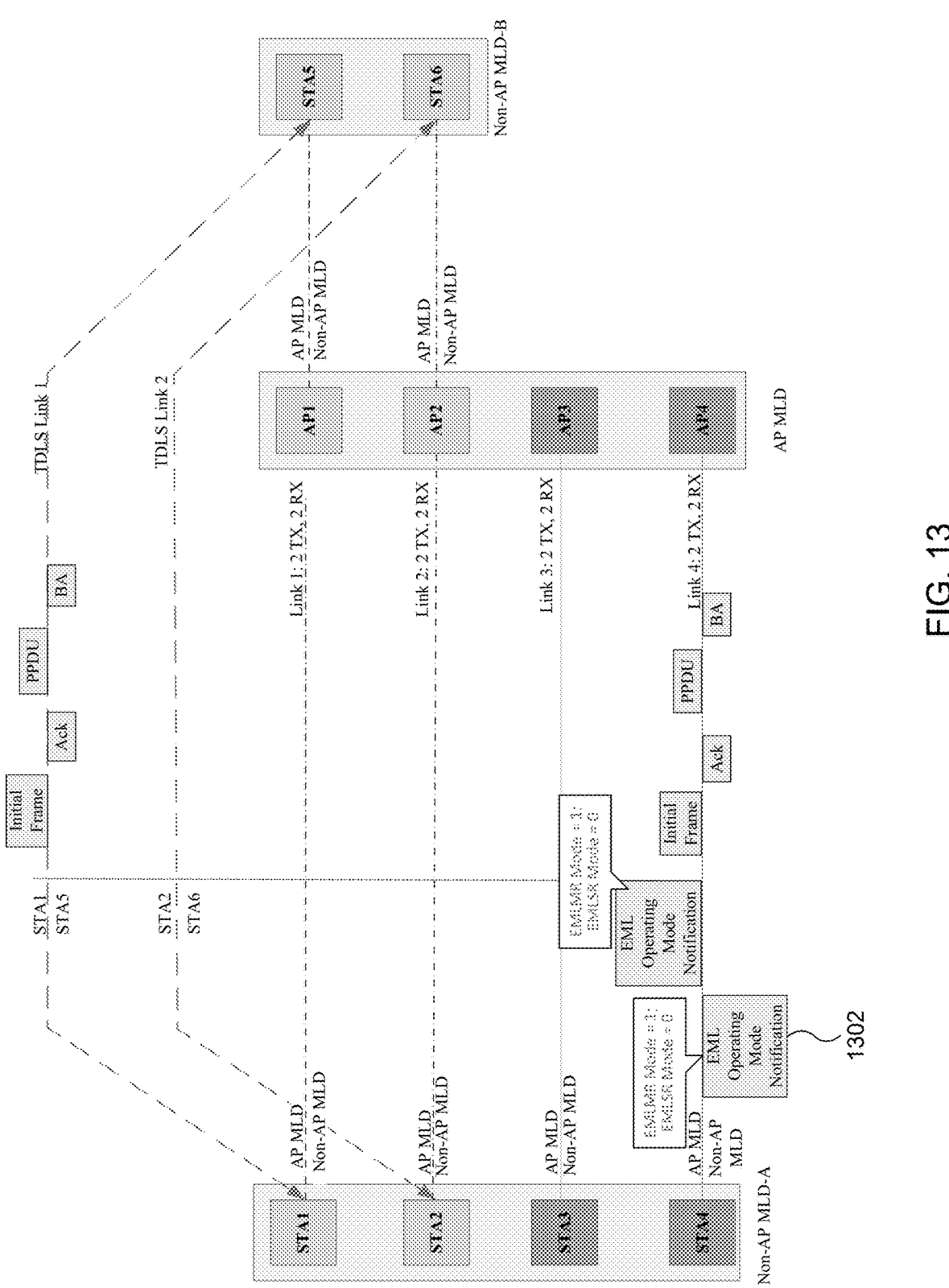
FIG. 13 illustrates an example of EMLMR operation of one non-AP MLD with an AP MLD and with a peer non-AP MLD according to various embodiments of the present disclosure.

FIG. 13 illustrates an example of EMLMR operation of one non-AP MLD with an AP MLD and with a peer non-AP MLD according to various embodiments of the present disclosure. In the example of FIG. 13, the set of EMLMR links configured for EMLMR operation between the AP MLD and the non-AP MLD (non-AP MLD-A)—Link 3 and Link 4—and the set of EMLMR links configured for EMLMR operation for P2P communication between non-AP MLD-A and its peer non-AP MLD (non-AP MLD-B) over established TDLS direct links—TDLS Link 1 and TDLS Link 2—are separate. As a result, non-AP MLD-A may conduct EMLMR frame exchanges at the same time with both the AP MLD and its peer non-AP MLD-B.

According to the embodiment of FIG. 13, non-AP MLD-A uses one EML Operating Mode Notification frame 1302 to transition into EMLMR mode for EMLMR frame exchanges with both the AP MLD and for P2P EMLMR frame exchanges with non-AP MLD-B.

According to another embodiment, separate indications can be made to the AP MLD and to another non-AP MLD to initiate transition into EMLMR mode for communication with the AP MLD and to initiate transition into EMLMR mode for P2P communication with the other non-AP MLD over TDLS links.

According to another embodiment of scenario (C) above, the EMLMR links set for EMLMR mode communication between a non-AP MLD and the AP MLD and the EMLMR links for P2P EMLMR operation between the non-AP MLD and another peer non-AP MLD can be overlapping. In this embodiment, once a non-AP MLD transitions into EMLMR mode it can exchange frames with the AP MLD and another non-AP MLD while staying in the EMLMR mode. This process of EMLMR frame exchange with the AP MLD and another non-AP MLD can be seamless. For example, the non-AP MLD can first complete the EMLMR frame exchange with the AP MLD over one of the EMLMR links and then can start another EMLMR frame exchange with another peer non-AP MLD over one of the TDLS direct links.

Figure 14:
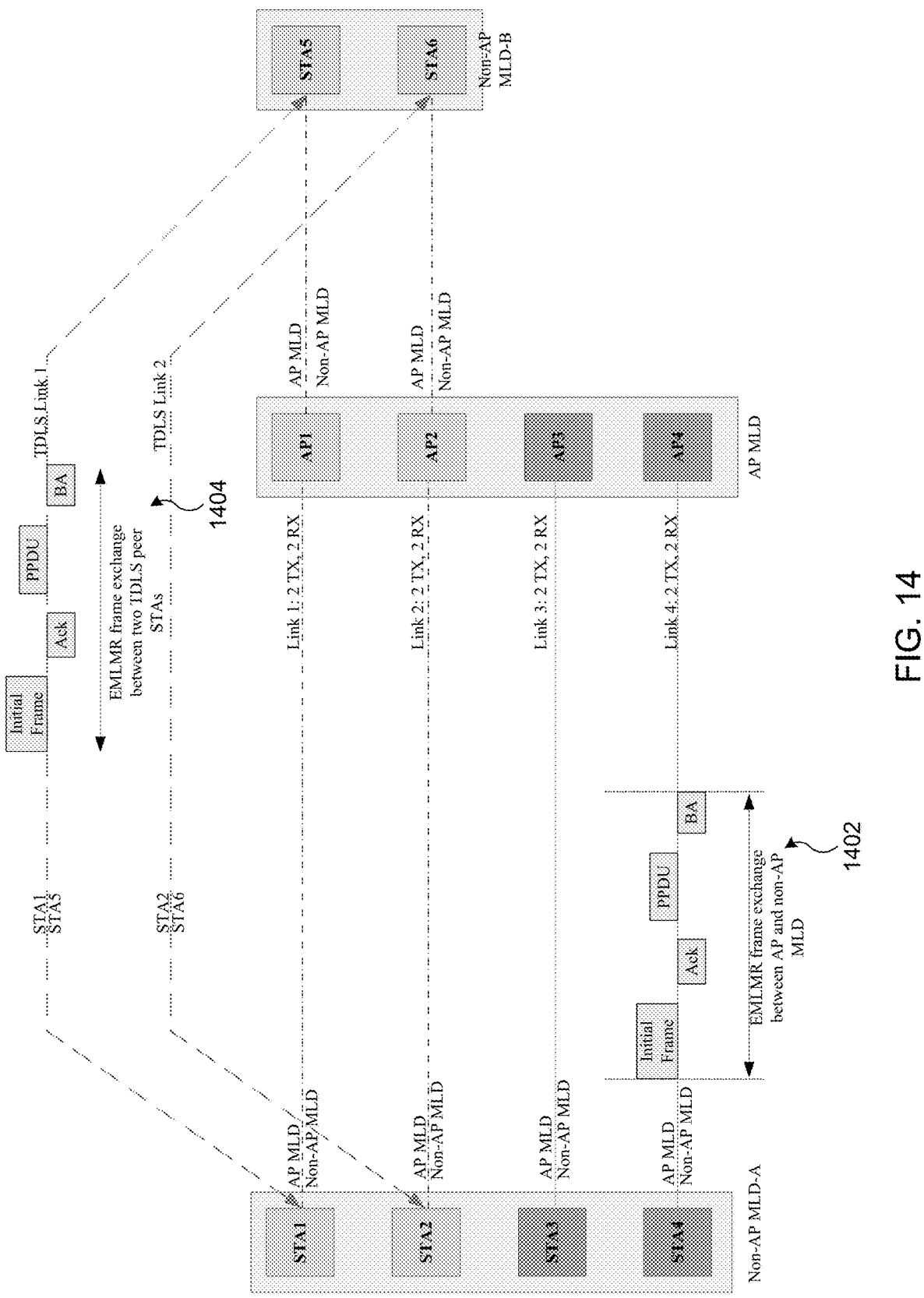
FIG. 14 illustrates another example of EMLMR operation of one non-AP MLD with an AP MLD and with a peer non-AP MLD according to various embodiments of the present disclosure.

FIG. 14 illustrates another example of EMLMR operation of one non-AP MLD with an AP MLD and with a peer non-AP MLD according to various embodiments of the present disclosure. In the example of FIG. 14, the set of EMLMR links configured for EMLMR operation between the AP MLD and the non-AP MLD (non-AP MLD-A)—Link 3 and Link 4— and the set of EMLMR links configured for EMLMR operation for P2P communication between non-AP MLD-A and its peer non-AP MLD (non-AP MLD-B) over established TDLS direct links—TDLS Link 1 and TDLS Link 2— are overlapping. As a result, EMLMR frame exchanges between non-AP MLD-A and the AP MLD and P2P EMLMR frame exchanges between non-AP MLD-A and its peer non-AP MLD-B are treated as if Link 3, Link 4, TDLS Link 1, and TDLS Link 2 are in one set of EMLMR links—an EMLMR frame exchange 1402 with the AP MLD over Link 4 is completed before a P2P EMLMR frame exchange 1404 with the peer non-AP MLD-B over TDLS Link 1 begins.

According to another embodiment, before starting the EMLMR frame exchange over one of the TDLS direct links, the transmitting non-AP MLD can send a notification frame to the AP MLD. This notification can be used by the AP MLD so that the AP MLD does not initiate another EMLMR frame exchange with the transmitting non-AP MLD. This notification frame can be a control frame, or an A-Control subfield, or any other frame. According to another embodiment, the transmitting non-AP MLD can also send the notification frame to its TDLS peer non-AP MLD before the transmitting non-AP MLD starts an EMLMR frame exchange with the AP MLD over one of the EMLMR links so that the other non-AP MLD does not start another EMLMR frame exchange with the transmitting non-AP MLD over any of the TDLS direct links.

Figure 15:
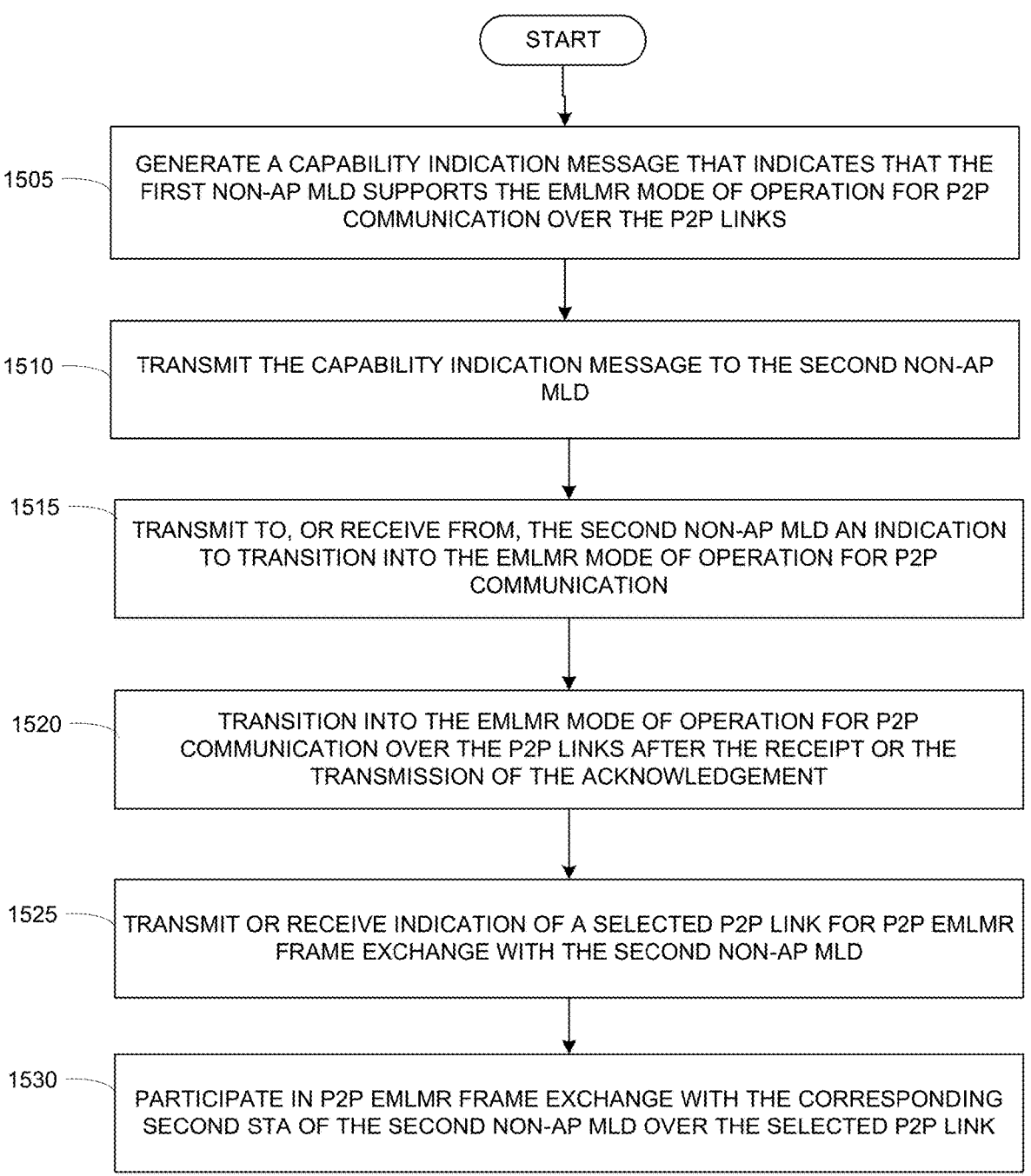
FIG. 15 illustrates an example process for facilitating the use of EMLMR operation for P2P communications between MLDs according to various embodiments of the present disclosure.

FIG. 15 illustrates an example process for facilitating the use of EMLMR operation for P2P communications between MLDs according to various embodiments of the present disclosure. For convenience, the process of FIG. 15 is discussed as being performed by a first WI-FI non-AP MLD comprising a plurality of first STAs that each comprise a transceiver configured to form a P2P link with a corresponding second STA of a second non-AP MLD, wherein at least a subset of the P2P links are also EMLMR links configured to operate in an EMLMR mode of operation for P2P communication. However, it is understood that any suitable wireless communication device could perform these processes.

Referring to FIG. 15, the process begins with the first non-AP MLD generating a capability indication message that indicates that the first non-AP MLD supports the EMLMR mode of operation for P2P communication over the P2P links (step 1505). In some embodiments, the capability indication message may be an EOMNF that includes an indication of the P2P links that are capable of the EMLMR mode of operation for P2P communication, or a basic multi-link element that includes the indication of the P2P links that are capable of the EMLMR mode of operation for P2P communication. The indicated P2P links may be different from another set of EMLMR links formed with an AP MLD.

The first non-AP MLD then transmits the capability indication message to the second non-AP MLD (step 1510). In some embodiments, the first non-AP MLD may transmit the message via the AP MLD.

Next, at step 1515, the first non-AP MLD transmits to, or receives from, the second non-AP MLD an indication to transition into the EMLMR mode of operation for P2P communication. In some embodiments, either the first or the second non-AP MLD may transmit initiate the transition by transmitting the indication. If the first non-AP MLD transmits the indication, it may receive an acknowledgement from the second non-AP MLD, and vice versa. The indication may be an EOMNF that has the EMLMR Mode set to 1 as the indication to transition into the EMLMR mode of operation for P2P communication.

In other embodiments, only one of the first or the second non-AP MLDs is allowed to initiate the transition. In such embodiments, the one of the non-AP MLDs that is allowed to initiate the transition may be pre-determined based on relative STR capabilities of the non-AP MLDs, or may be determined during a setup procedure for the P2P links that is conducted by the first and second non-AP MLDs.

After transmitting or receiving the acknowledgement, the first non-AP MLD transitions into the EMLMR mode of operation for P2P communication over the P2P links (step 1520). In some embodiments, a processor of the first non-AP MLD causes the first non-AP MLD to make the transition.

The first non-AP MLD next transmits to, or receives from, the second non-AP MLD an indication of a selected P2P link (or links) for a P2P EMLMR frame exchange with the second non-AP MLD (step 1525). The indication may be an EMLMR start frame, and the P2P link on which it is transmitted is indicated as the P2P link selected for the P2P EMLMR frame exchange. In some embodiments, either the first or the second non-AP MLD may select the link, and transmit the indication. In other embodiments, only one of the first or the second non-AP MLDs is allowed to select the link and transmit the indication. In such cases, the one of non-AP MLDs that is allowed to select the link may be pre-determined based on relative STR capabilities of the non-AP MLDs, or may be determined during a setup procedure for the P2P links that is conducted by the first and second non-AP MLDs.

Finally, the first non-AP MLD participates, via at least one of the first STAs, in the P2P EMLMR frame exchange with the corresponding second STA of the second non-AP MLD over the selected P2P link or links (step 1530).

In some embodiments, the first non-AP MLD also forms EMLMR links with an AP MLD. In such embodiments, the first non-AP MLD may also transition into the EMLMR mode of operation for communication with the AP MLD over the EMLMR links. In embodiments in which the set of EMLMR links is different from the set of P2P EMLMR links, the EMLMR frame exchange with the AP MLD may proceed while the P2P EMLMR frame exchange is ongoing. In embodiments in which the set of EMLMR links with the AP MLD overlap with the set of P2P EMLMR links, the EMLMR frame exchange with the AP MLD may not overlap in time with the P2P EMLMR frame exchange.

The above flowchart illustrates an example method or process that can be implemented in accordance with the principles of the present disclosure and various changes could be made to the methods or processes illustrated in the flowcharts. For example, while shown as a series of steps, various steps could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A first non-access point (AP) multi-link device (MLD), comprising:

first stations (STAs), each comprising a transceiver configured to form a peer-to-peer (P2P) link with a corresponding second STA of a second non-AP MLD, wherein at least a subset of the P2P links are also enhanced multi-link multi-radio (EMLMR) links configured to operate in an EMLMR mode of operation for P2P communication; and a processor operably coupled to the first STAs, the processor configured to transition the first non-AP MLD into the EMLMR mode of operation for P2P communication over the P2P links, wherein at least one of the first STAs is configured to participate in a P2P EMLMR frame exchange with the corresponding second STA of the second non-AP MLD over at least one of the P2P links; and wherein at least one of the transceivers is further configured to, before the P2P EMLMR frame exchange:

transmit, to the second non-AP MLD over the at least one of the P2P links, an EMLMR start frame as an indication that the at least one of the P2P links is selected for the P2P EMLMR frame exchange; or receive, from the second non-AP MLD over the at least one of the P2P links, the EMLMR start frame.

2. The first non-AP MLD of claim 1, wherein:

the processor is further configured to generate a capability indication message that indicates that the first non-AP MLD supports the EMLMR mode of operation for P2P communication over the P2P links, and at least one of the transceivers is further configured to transmit the capability indication message to the second non-AP MLD.

3. The first non-AP MLD of claim 2, wherein:

each transceiver is further configured to form a link with a corresponding AP of an AP MLD and at least a subset of the links are also EMLMR links configured to operate in the EMLMR mode of operation for communication with the AP MLD, and the processor is further configured to generate the capability indication message as one of:

an EML operating mode notification frame (EOMNF) that includes an indication of the P2P links that are capable of the EMLMR mode of operation for P2P communication; or a basic multi-link element that includes the indication of the P2P links that are capable of the EMLMR mode of operation for P2P communication.

4. The first non-AP MLD of claim 1, wherein:

at least one of the transceivers is further configured to:

transmit, to the second non-AP MLD, an EOMNF that includes an indication to transition into the EMLMR mode of operation for P2P communication and receive, from the second non-AP MLD, an acknowledgement of the EOMNF; or receive, from the second non-AP MLD, the EOMNF and transmit, to the second non-AP MLD, the acknowledgement of the EOMNF, and the processor is further configured to transition the first non-AP MLD into the EMLMR mode of operation for P2P communication over the P2P links after the receipt or the transmission of the acknowledgement.

5. The first non-AP MLD of claim 1, wherein:

one of the first non-AP MLD or the second non-AP MLD is allowed to initiate transition into the EMLMR mode of operation for P2P communication, at least one of the transceivers is further configured to:

based on the first non-AP MLD being allowed to initiate the transition, transmit, to the second non-AP MLD, an EOMNF that includes an indication to transition into the EMLMR mode of operation for P2P communication and receive, from the second non-AP MLD, an acknowledgement of the EOMNF; or based on the second non-AP MLD being allowed to initiate the transition, receive, from the second non-AP MLD, the EOMNF and transmit, to the second non-AP MLD, the acknowledgement of the EOMNF, and the processor is further configured to transition the first non-AP MLD into the EMLMR mode of operation for P2P communication over the P2P links after the receipt or the transmission of the acknowledgement.

6. The first non-AP MLD of claim 5, wherein:

the one of the first non-AP MLD or the second non-AP MLD that is allowed to initiate the transition is:

pre-determined based on relative simultaneous transmit and receive (STR) capabilities of the non-AP MLDs, or determined during a setup procedure for the P2P links that is conducted by the first and second non-AP MLDs.

7. The first non-AP MLD of claim 1, wherein:

one of the first non-AP MLD or the second non-AP MLD is allowed to select the at least one of the P2P links for the P2P EMLMR frame exchange, and at least one of the transceivers is further configured to, before the P2P EMLMR frame exchange:

based on the first non-AP MLD being allowed to select the at least one of the P2P links, transmit, to the second non-AP MLD over the at least one of the P2P links, an EMLMR start frame as an indication that the at least one of the P2P links is selected for the P2P EMLMR frame exchange; or based on the second non-AP MLD being allowed to select the at least one of the P2P links, receive, from the second non-AP MLD over the at least one of the P2P links, the EMLMR start frame.

8. The first non-AP MLD of claim 1, wherein:

the transceivers are each further configured to form a link with a corresponding AP of an AP MLD, wherein at least a subset of the links are also EMLMR links configured to operate in the EMLMR mode of operation, the subset of links that are EMLMR links are different from the subset of links that are P2P EMLMR links, the processor is further configured to transition the first non-AP MLD into the EMLMR mode of operation for communication with the AP MLD over the EMLMR links, and at least another of the first STAs is configured to partici-
pate in an EMLMR frame exchange with the corre-
sponding AP of the AP MLD over at least one of the
links while the P2P EMLMR frame exchange is ongo-
ing.

9. The first non-AP MLD of claim 1, wherein:
the transceivers are each further configured to form a link
with a corresponding AP of an AP MLD, wherein at
least a subset of the links are also EMLMR links
configured to operate in the EMLMR mode of opera-
tion,
some of the subset of links that are EMLMR links are also
P2P EMLMR links,
the processor is further configured to transition the first
non-AP MLD into the EMLMR mode of operation for
communication with the AP MLD over the EMLMR
links, and
at least another one of the first STAs is configured to
participate in an EMLMR frame exchange with the
corresponding AP of the AP MLD over at least one of
the links such that the EMLMR frame exchange does
not overlap in time with the P2P EMLMR frame
exchange.

10. A method of wireless communication performed by a
first non-access point (AP) multi-link device (MLD) that
comprises first stations (STAs):
transitioning the first non-AP MLD into an enhanced
multi-link multi-radio (EMLMR) mode of operation
for peer-to-peer (P2P) communication over P2P links
that are formed between the first STAs and correspond-
ing second STAs of a second non-AP MLD, wherein at
least a subset of the P2P links are also EMLMR links
configured to operate in the EMLMR mode of opera-
tion for P2P communication;
transmitting, to the second non-AP MLD over the at least
one of the P2P links, an EMLMR start frame as an
indication that the at least one of the P2P links is
selected for a P2P EMLMR frame exchange; or receiv-
ing, from the second non-AP MLD over the at least one
of the P2P links, the EMLMR start frame; and
participating, via at least one of the first STAs, in the P2P
EMLMR frame exchange with the corresponding sec-
ond STA of the second non-AP MLD over at least one
of the P2P links.

11. The method of claim 10, further comprising:
generating a capability indication message that indicates
that the first non-AP MLD supports the EMLMR mode
of operation for P2P communication over the P2P links;
and
transmitting the capability indication message to the sec-
ond non-AP MLD.

12. The method of claim 11, wherein:
links are formed between each of the first STAs and a
corresponding AP of an AP MLD and at least a subset
of the links are also EMLMR links configured to
operate in the EMLMR mode of operation for commu-
nication with the AP MLD, and
the capability indication message is one of:
an EML operating mode notification frame (EOMNF)
that includes an indication of the P2P links that are
capable of the EMLMR mode of operation for P2P
communication; or
a basic multi-link element that includes the indication
of the P2P links that are capable of the EMLMR
mode of operation for P2P communication.

13. The method of claim 10, further comprising:
one of:
transmitting, to the second non-AP MLD, an EOMNF
that includes an indication to transition into the
EMLMR mode of operation for P2P communication
and receiving, from the second non-AP MLD, an
acknowledgement of the EOMNF, or
receiving, from the second non-AP MLD, the EOMNF
and transmitting, to the second non-AP MLD, the
acknowledgement of the EOMNF; and
transitioning the first non-AP MLD into the EMLMR
mode of operation for P2P communication over the P2P
links after the receipt or the transmission of the
acknowledgement.

14. The method of claim 10, wherein:
one of the first non-AP MLD or the second non-AP MLD
is allowed to initiate transition into the EMLMR mode
of operation for P2P communication, and
the method further comprises:
one of:
based on the first non-AP MLD being allowed to
initiate the transition, transmitting, to the second
non-AP MLD, an EOMNF that includes an indica-
tion to transition into the EMLMR mode of operation
for P2P communication and receiving, from the
second non-AP MLD, an acknowledgement of the
EOMNF, or
based on the second non-AP MLD being allowed to
initiate the transition, receiving, from the second
non-AP MLD, the EOMNF and transmitting, to the
second non-AP MLD, the acknowledgement of the
EOMNF; and
transitioning the first non-AP MLD into the EMLMR
mode of operation for P2P communication over the P2P
links after the receipt or the transmission of the
acknowledgement.

15. The method of claim 14, wherein:
the one of the first non-AP MLD or the second non-AP
MLD that is allowed to initiate the transition is:
pre-determined based on relative simultaneous transmit
and receive (STR) capabilities of the non-AP MLDs,
or
determined during a setup procedure for the P2P links
that is conducted by the first and second non-AP
MLDs.

16. The method of claim 10, wherein:
one of the first non-AP MLD or the second non-AP MLD
is allowed to select the at least one of the P2P links for
the P2P EMLMR frame exchange, and
the method further comprises:
before the P2P EMLMR frame exchange, based on the
first non-AP MLD being allowed to select the at least
one of the P2P links, transmitting, to the second
non-AP MLD over the at least one of the P2P links,
an EMLMR start frame as an indication that the at
least one of the P2P links is selected for the P2P
EMLMR frame exchange; or
before the P2P EMLMR frame exchange, based on the
second non-AP MLD being allowed to select the at
least one of the P2P links, receiving, from the second
non-AP MLD over the at least one of the P2P links,
the EMLMR start frame.

17. The method of claim 10, wherein:
links are formed between each of the first STAs and a
corresponding AP of an AP MLD and at least a subset
of the links are also EMLMR links configured to operate in the EMLMR mode of operation for communication with the AP MLD, the subset of links that are EMLMR links are different from the subset of links that are P2P EMLMR links, and the method further comprises:

transitioning the first non-AP MLD into the EMLMR mode of operation for communication with the AP MLD over the EMLMR links; and participating, via at least another of the first STAs, in an EMLMR frame exchange with the corresponding AP of the AP MLD over at least one of the links while the P2P EMLMR frame exchange is ongoing.

18. The method of claim 10, wherein:

links are formed between each of the first STAs and a corresponding AP of an AP MLD and at least a subset of the links are also EMLMR links configured to operate in the EMLMR mode of operation for communication with the AP MLD, some of the subset of links that are EMLMR links are also P2P EMLMR links, and the method further comprises:

transitioning the first non-AP MLD into the EMLMR mode of operation for communication with the AP MLD over the EMLMR links; and participating, via at least another of the first STAs, in an EMLMR frame exchange with the corresponding AP of the AP MLD over at least one of the links such that the EMLMR frame exchange does not overlap in time with the P2P EMLMR frame exchange.

19. An access point (AP) multi-link device (MLD), comprising:

APs, each comprising a transceiver configured to form a link with a corresponding first station (STA) of a first non-AP MLD, wherein:

at least a subset of the links are also enhanced multi-link multi-radio (EMLMR) links configured to operate in an EMLMR mode of operation, and the first non-AP MLD has formed peer-to-peer (P2P) links that are also EMLMR links between the first STAs and corresponding second STAs of a second non-AP MLD; and a processor operably coupled to the APs, the processor configured to transition the AP MLD into the EMLMR mode of operation for communication with the first non-AP MLD over the EMLMR links, wherein at least one of the APs is configured to participate in an EMLMR frame exchange with the corresponding first STA of the first non-AP MLD over at least one of the EMLMR links while the P2P EMLMR frame exchange is ongoing.

20. The AP MLD of claim 19, wherein:

the subset of links that are EMLMR links are different from the links that are P2P EMLMR links, and the at least one of the APs is configured to participate in the EMLMR frame exchange with the corresponding first STA of the first non-AP MLD over the at least one of the EMLMR links while a P2P EMLMR frame exchange is ongoing between another of the first STAs and the corresponding second STA of the second non-AP MLD over at least one of the P2P links.

21. The AP MLD of claim 19, wherein:

some of the subset of links that are EMLMR links are also P2P EMLMR links, and the at least one of the APs is configured to participate in the EMLMR frame exchange with the corresponding first STA of the first non-AP MLD over the at least one of the EMLMR links such that the EMLMR frame exchange does not overlap in time with a P2P EMLMR frame exchange between another of the first STAs and the corresponding second STA of the second non-AP MLD over at least one of the P2P links.

* * * * *